US011365008B2

(12) United States Patent
Dowty et al.

(10) Patent No.: US 11,365,008 B2
(45) Date of Patent: Jun. 21, 2022

(54) STOWAGE MECHANISMS FOR DISPLAY DEVICES OF AIRCRAFT PASSENGER COMPARTMENT SUITES

(71) Applicant: B/E Aerospace, Inc., Winston-Salem, NC (US)

(72) Inventors: Mark B. Dowty, Rural Hall, NC (US); Dennis M. Heuer, Kernersville, NC (US); Lyle T. Davis, Pfafftown, NC (US); Robert J. Henshaw, Newnan, GA (US); Robert D. Wilkey, Atlanta, GA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 318 days.

(21) Appl. No.: 16/712,229

(22) Filed: Dec. 12, 2019

(65) Prior Publication Data

US 2021/0179268 A1 Jun. 17, 2021

(51) Int. Cl.
*B64D 11/00* (2006.01)
*B64D 11/06* (2006.01)

(52) U.S. Cl.
CPC ...... *B64D 11/0023* (2013.01); *B64D 11/0015* (2013.01); *B64D 11/0602* (2014.12); *B64D 11/0606* (2014.12)

(58) Field of Classification Search
CPC ............ B64D 11/0023; B64D 11/0606; B64D 11/0015
See application file for complete search history.

(56) References Cited

U.S. PATENT DOCUMENTS

| | | | |
|---|---|---|---|
| 5,177,616 A | 1/1993 | Riday |
| 5,179,447 A | 1/1993 | Lain |
| 5,583,735 A | 12/1996 | Pease et al. |
| 5,709,360 A | 1/1998 | Rosen |

(Continued)

FOREIGN PATENT DOCUMENTS

| | | |
|---|---|---|
| DE | 10212944 A1 | 10/2002 |
| DE | 10161663 A1 | 6/2003 |

(Continued)

OTHER PUBLICATIONS

Extended Search Report for European Application No. 20213947.3 dated May 6, 2021, 11 pages.

*Primary Examiner* — Richard R. Green
*Assistant Examiner* — Ashesh Dangol
(74) *Attorney, Agent, or Firm* — Suiter Swantz pc llo

(57) ABSTRACT

An aircraft passenger compartment suite may include a first side with a first display device, a second side with a second display device, and a privacy divider separating the first side and the second side. The first display device may be configured to actuate between a first deployed position and a first stowed position via a first stowage mechanism. The second display device may be configured to actuate between a second deployed position and a second stowed position via a second stowage mechanism. The privacy divider may include one or more panels configured to actuate between a panel deployed position and a panel stowed position. The privacy divider may be open when at least one of the first display device is in the first stowed position, the second display device is in the second stowed position, or the one or more panels are in the panel stowed position.

9 Claims, 23 Drawing Sheets

(56) References Cited

U.S. PATENT DOCUMENTS

| | | | |
|---|---|---|---|
| 5,732,919 A | 3/1998 | Rosen et al. | |
| 6,633,286 B1 | 10/2003 | Do et al. | |
| 7,405,773 B2 | 7/2008 | Lester et al. | |
| 8,259,437 B2 | 9/2012 | Vesely | |
| 8,267,472 B2 | 9/2012 | Large et al. | |
| 9,010,852 B1 | 4/2015 | Conrad et al. | |
| 9,469,405 B2 | 10/2016 | Henshaw | |
| 9,617,001 B2 | 4/2017 | Zimmermann | |
| 10,065,573 B2 | 9/2018 | Nakano | |
| 2004/0239155 A1 | 12/2004 | Fourrey et al. | |
| 2005/0111176 A1 | 5/2005 | Sorensen et al. | |
| 2007/0170310 A1* | 7/2007 | Bock | B64D 11/0638 244/118.5 |
| 2013/0242523 A1* | 9/2013 | Wallace | B60R 11/0235 297/217.3 |
| 2014/0361585 A1 | 12/2014 | Henshaw | |
| 2016/0297524 A1 | 10/2016 | Simeon et al. | |
| 2016/0340041 A1* | 11/2016 | Peuziat | B60R 11/0235 |
| 2019/0315468 A1 | 10/2019 | White et al. | |
| 2020/0216177 A1* | 7/2020 | White | B64D 11/0601 |

FOREIGN PATENT DOCUMENTS

| | | |
|---|---|---|
| DE | 102004047609 A1 | 5/2005 |
| DE | 102011090045 A1 | 7/2013 |
| GB | 2340389 A | 2/2000 |
| JP | 1992212648 A | 1/1991 |
| WO | 2018178276 A1 | 10/2018 |

* cited by examiner

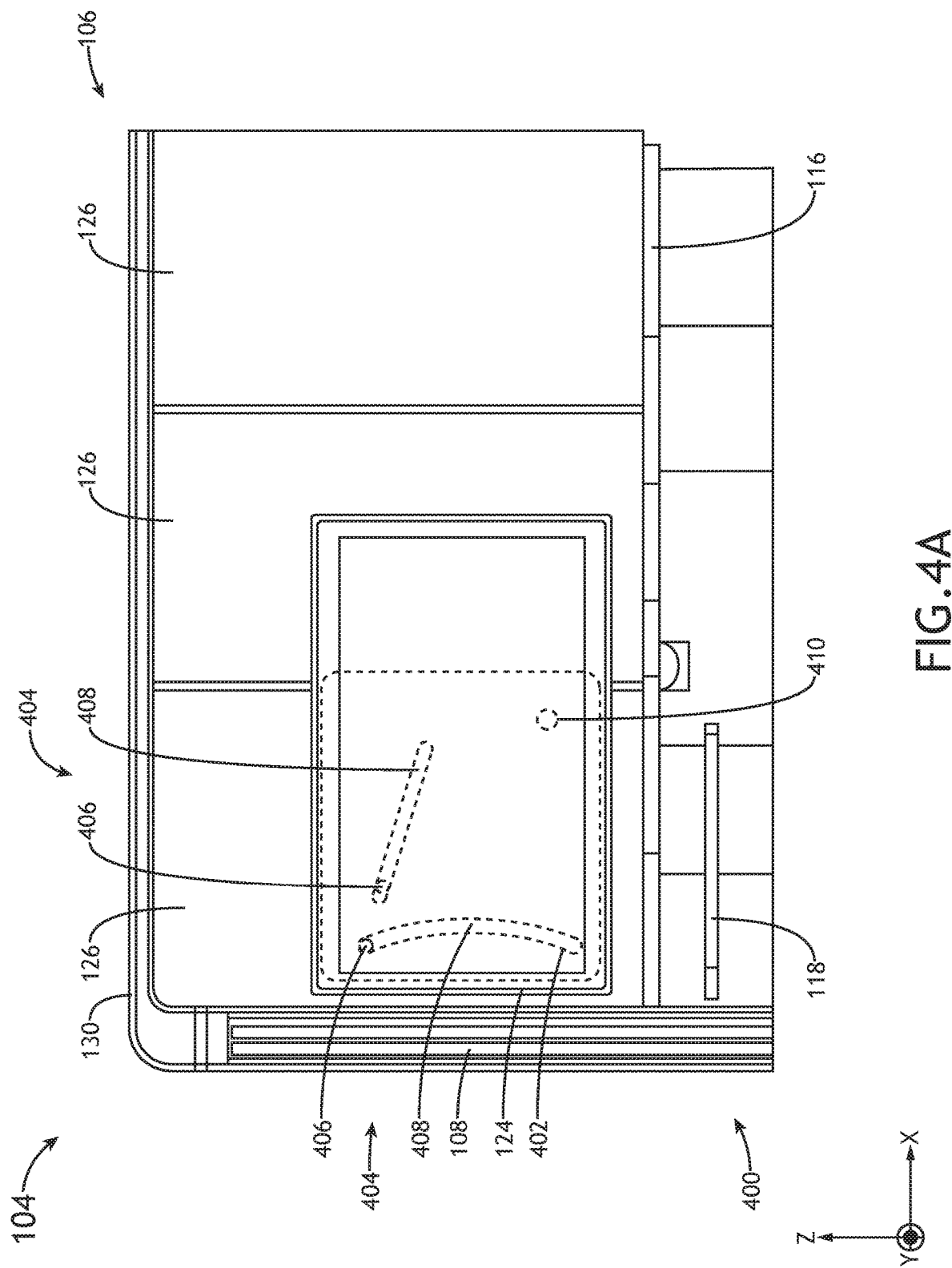

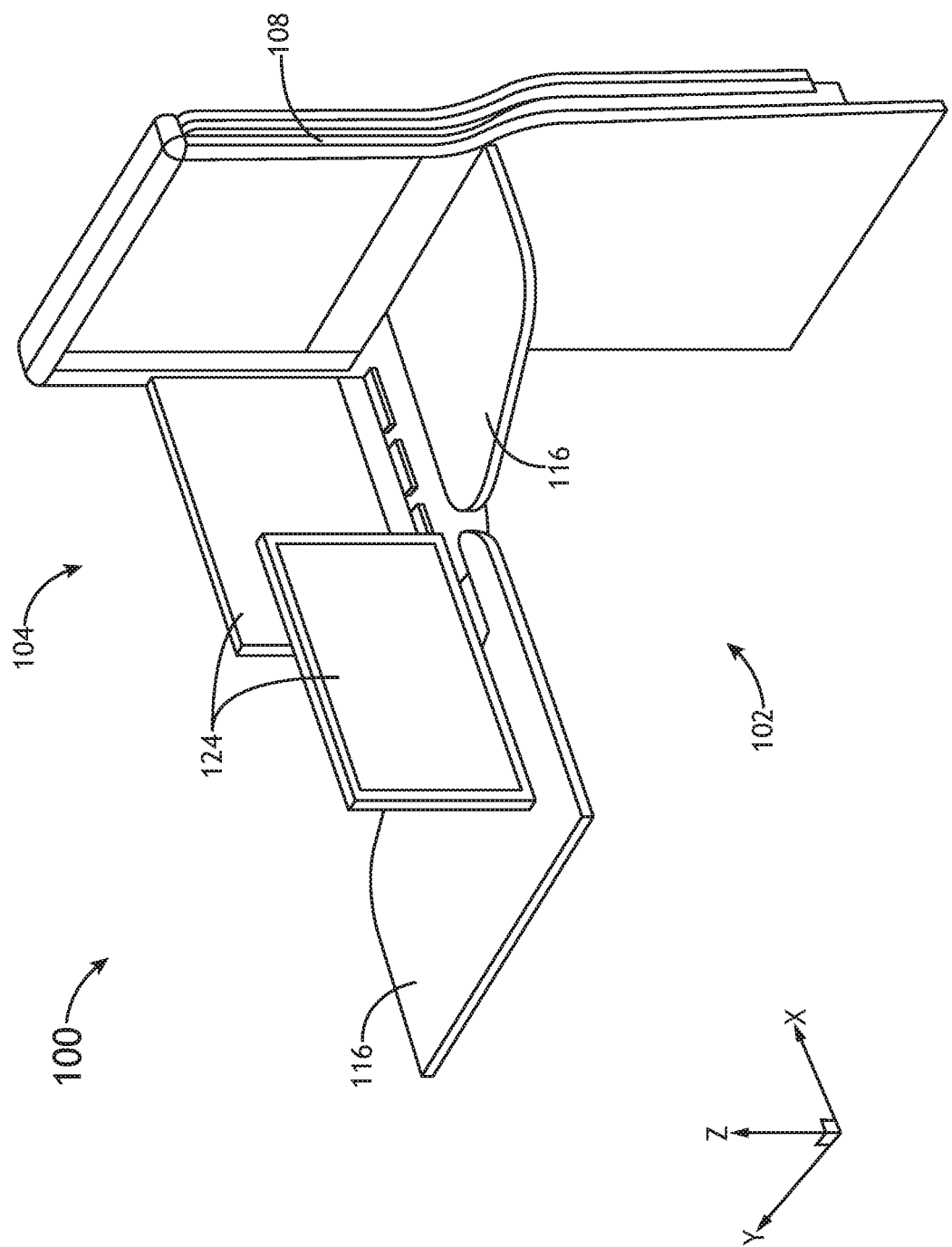

STOWAGE MECHANISMS FOR DISPLAY DEVICES OF AIRCRAFT PASSENGER COMPARTMENT SUITES

BACKGROUND

In commercial transportation vehicles such as passenger aircraft, an aircraft passenger compartment suite may include one or more seats. In select arrangements where there are multiple seats in the aircraft passenger compartment suite, the multiple seats may be separated by a privacy divider. The aircraft passenger compartment suite may include one or more display devices proximate to the privacy divider. Opening the privacy divider separating the multiple seats may require re-positioning the one or more display devices.

SUMMARY

An aircraft passenger compartment suite is disclosed, in accordance with one or more embodiments of the disclosure. The aircraft passenger compartment suite may include a first side with a first display device. The first display device may be configured to actuate between a first display device deployed position and a first display device stowed position via a first display device stowage mechanism. The aircraft passenger compartment suite may include a second side including a second display device. The second display device may be configured to actuate between a second display device deployed position and a second display device stowed position via a second display device stowage mechanism. The aircraft passenger compartment suite may include a privacy divider separating the first side including the first display device and the second side including the second display device. The privacy divider may include one or more panels. The one or more panels may be configured to actuate between a panel deployed position and a panel stowed position. The privacy divider may be open when at least one of the first display device is in the first display device stowed position, the second display device is in the second display device stowed position, or the one or more panels are in the panel stowed position.

In some embodiments, the privacy divider may be closed when the first display device is in the first deployed position, the second display device is in the second deployed position, and the one or more panels are in the panel deployed position.

In some embodiments, the first display device stowage mechanism and the second display device stowage mechanism may include one or more different actuation components.

In some embodiments, the first display device stowage mechanism may include an arm coupled to the privacy divider via a first coupler and coupled to the first display device via a second coupler. The arm may be configured to rotate the first display device between the first display device deployed position and the first display device stowed position about an axis through the first coupler.

In some embodiments, the arm may be configured to rotate the first display device between the first display device deployed position and the first display device stowed position about an axis through the second coupler.

In some embodiments, the second display device stowage mechanism may include one or more track assemblies. Each track assembly of the one or more track assemblies may include a track. Each track assembly of the one or more track assemblies may include a pin configured to run along the track. The one or more track assemblies may be configured to rotate the second display device about an axis through the second display device between the second display device deployed position and the second display device stowed position.

In some embodiments, the second display device stowage mechanism may include a straight track assembly. The straight track assembly may include a straight track. The straight track assembly may include a pin configured to run along the straight track. The second display device stowage mechanism may include a curved track assembly. The curved track assembly may include a curved track. The curved track assembly may include a pin configured to run along the curved track. The curved track assembly may be set at an angle relative to the straight track assembly. The straight track assembly and the curved track assembly may be configured to rotate the second display device about the axis through the second display device between the second display device deployed position and the second display device stowed position.

In some embodiments, the one or more panels may include one or more panels configured to stow proximate to the first display device in a first panel stowed position when the first display device is in the first display device stowed position.

In some embodiments, the one or more panels may include one or more panels configured to stow proximate to the second display device in a second panel stowed position when the second display device is in the second display device stowed position.

In some embodiments, the one or more panels may include one or more panels configured to stow by actuate upward about an axis through a top edge of the one or more panels.

An aircraft passenger compartment suite is disclosed, in accordance with one or more embodiments of the disclosure. The aircraft passenger compartment suite may include a first stowage mechanism configured to actuate a first display device. The first display device may be positioned in a first side of the aircraft passenger compartment suite when in the first display device deployed position. The first display device may be viewable from the first side when in the first display device deployed position. The aircraft passenger compartment suite may include a second stowage mechanism configured to actuate at least one of the first display device or a second display device. The second display device may be positioned in a second side of the aircraft passenger compartment suite when in a second display device deployed position. The second side including the second display device may be separated from the first side including the first display device via a privacy divider. The second display device may be viewable from the second side when in the second display device deployed position. The second display device may be viewable from the first side and the second side when in a second display device stowed position.

In some embodiments, the first stowage mechanism may be configured to rotate the first display device about a first axis. The second stowage mechanism may be configured to rotate the first display device and the second display device about a second axis. The first display device may face inward toward a surface of a privacy shell element of the aircraft passenger compartment suite following the rotation of the first display device and the second display device about the second axis. The second display device may face outward into the aircraft passenger compartment suite following the rotation of the first display device and the second display device about the second axis.

In some embodiments, the first stowage mechanism may be configured to rotate the first display device about a first axis. The first display device may face downward toward a floor surface of the aircraft passenger compartment suite following the rotation of the first display device about the first axis. The second stowage mechanism may be configured to rotate the second display device about a second axis. The second display device may face outward into the aircraft passenger compartment suite following the rotation of the first display device and the second display device about the second axis.

In some embodiments, a rear surface of the first display device may be configured to be a horizontal surface in the first side of the aircraft passenger compartment suite when in the first display device is in the first display device stowed position.

In some embodiments, the first display device may be configured to be protected by a cover when in the first display device is in the first display device stowed position. The cover may be configured to be a horizontal surface in the first side of the aircraft passenger compartment suite.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 4A illustrates a display device and a set of privacy divider panels of an aircraft compartment passenger suite, in accordance with one or more embodiments of the disclosure;

FIG. 5A illustrates a set of display devices and a privacy divider section of an aircraft compartment passenger suite, in accordance with one or more embodiments of the disclosure;

DETAILED DESCRIPTION OF THE INVENTION

Figure 1A:
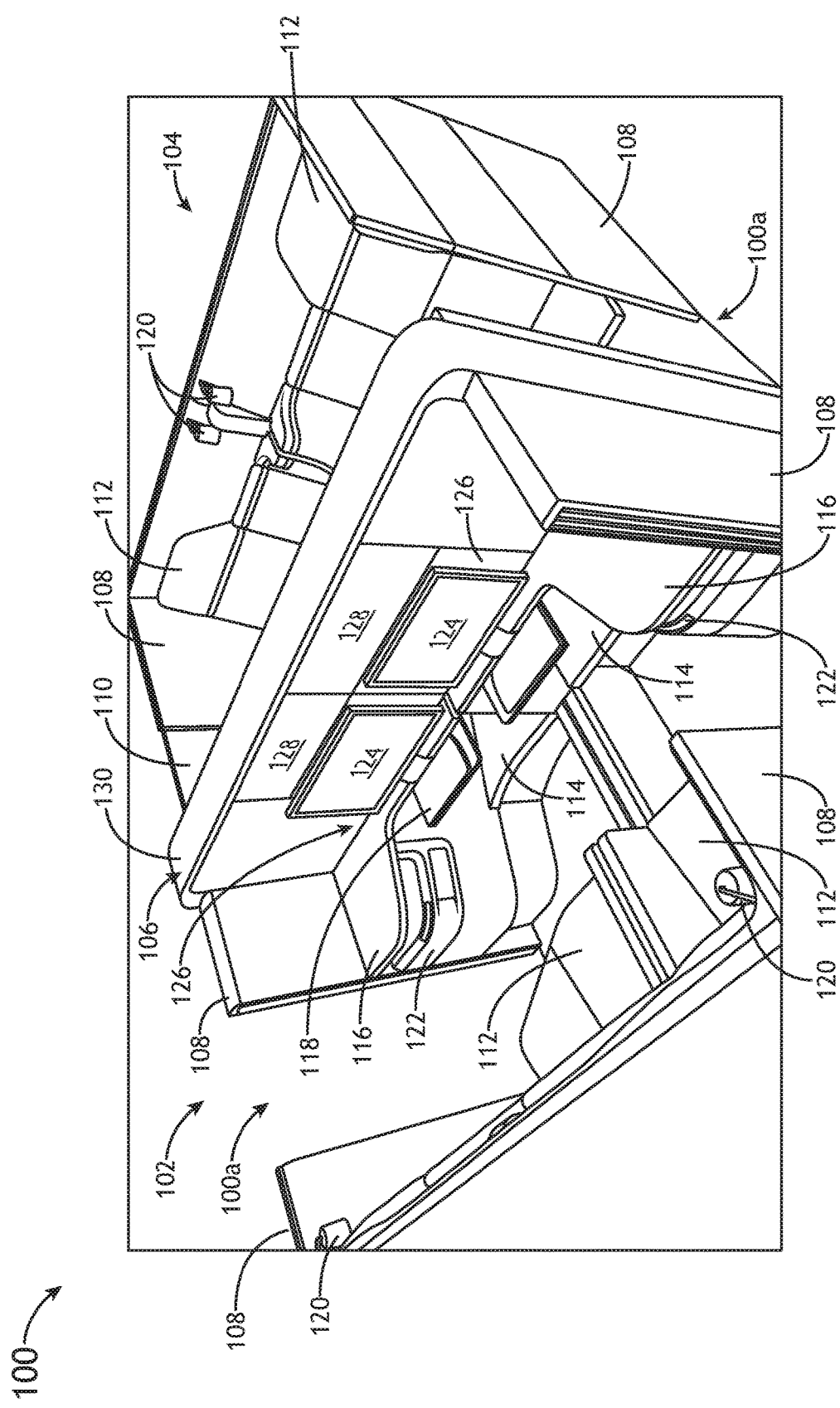
FIG. 1A illustrates an aircraft compartment passenger suite, in accordance with one or more embodiments of the disclosure.
Figure 1B:
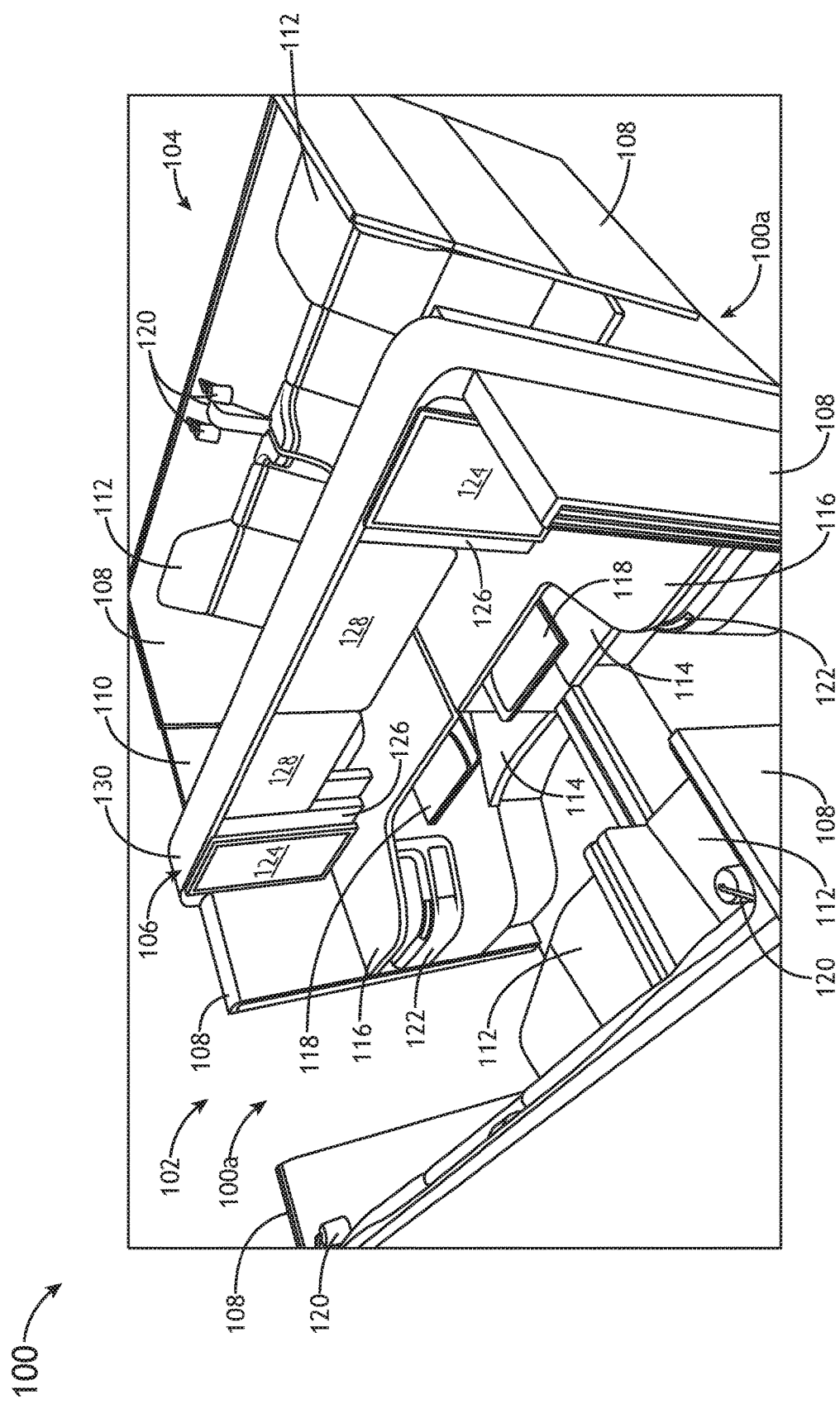
FIG. 1B Illustrates an aircraft compartment passenger suite, in accordance with one or more embodiments of the disclosure.
Figure 1C:
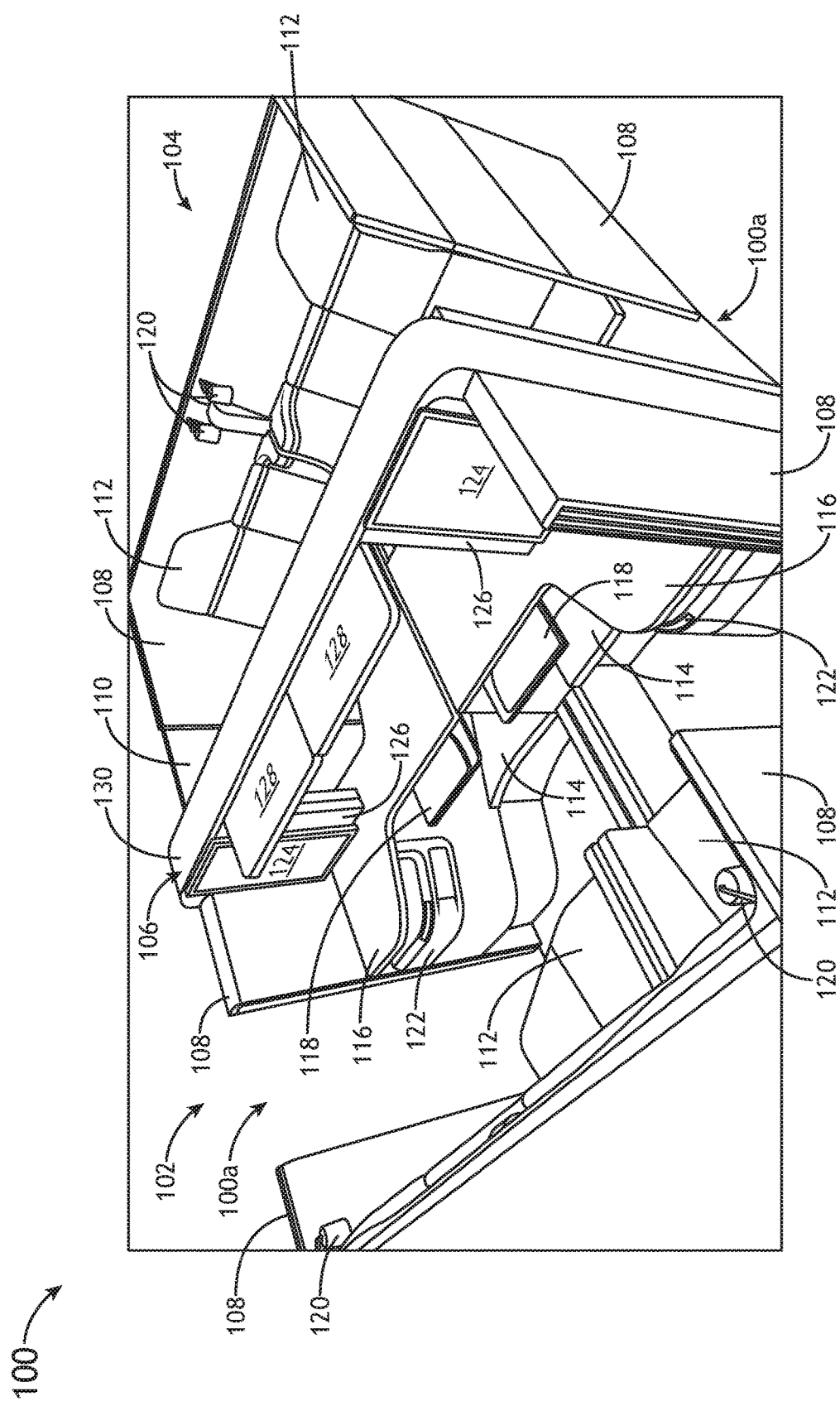
FIG. 1C illustrates an aircraft compartment passenger suite, in accordance with one or more embodiments of the disclosure.
Figure 2A:
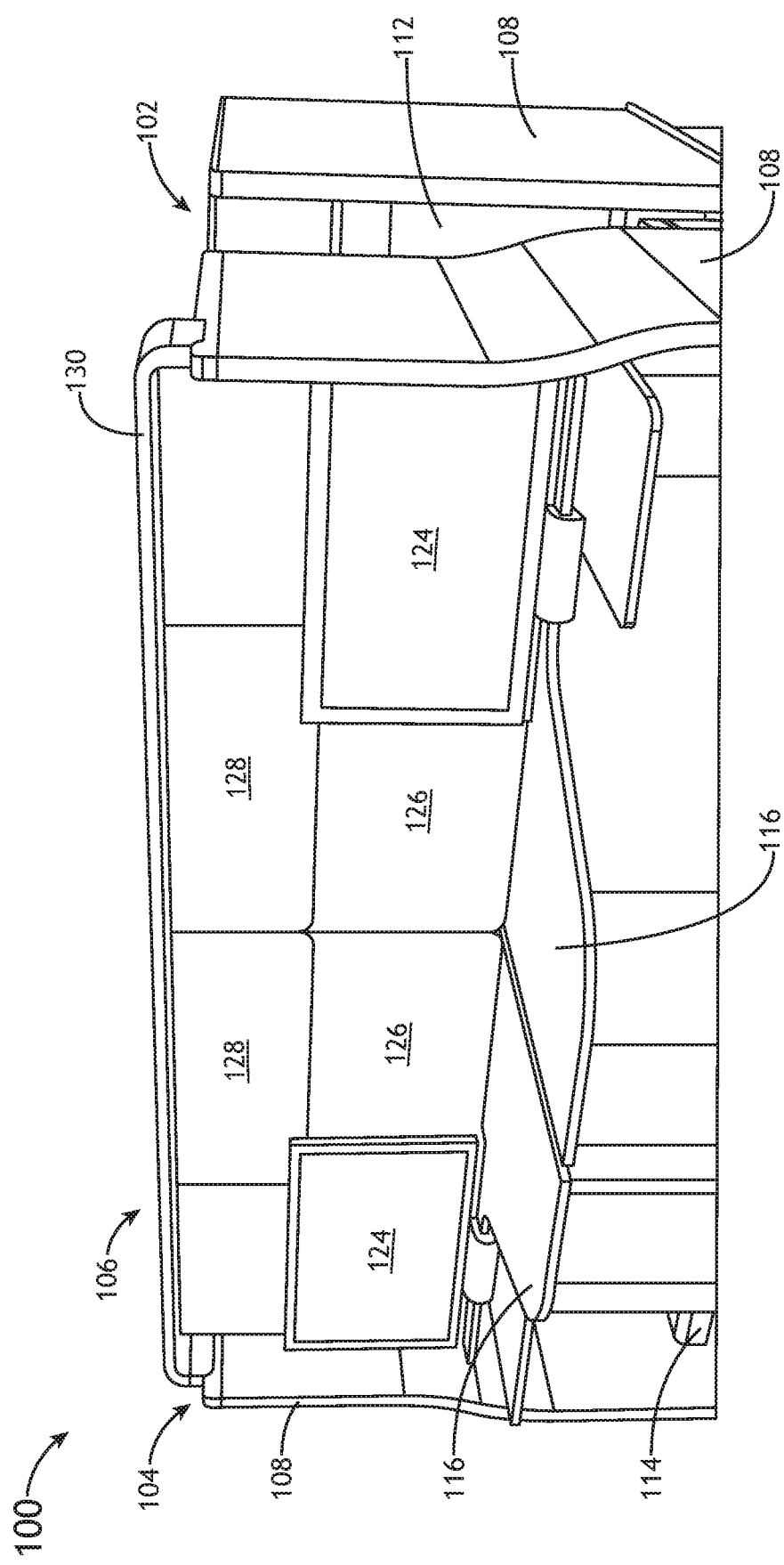
FIG. 2A illustrates an aircraft compartment passenger suite, in accordance with one or more embodiments of the disclosure.
Figure 2B:
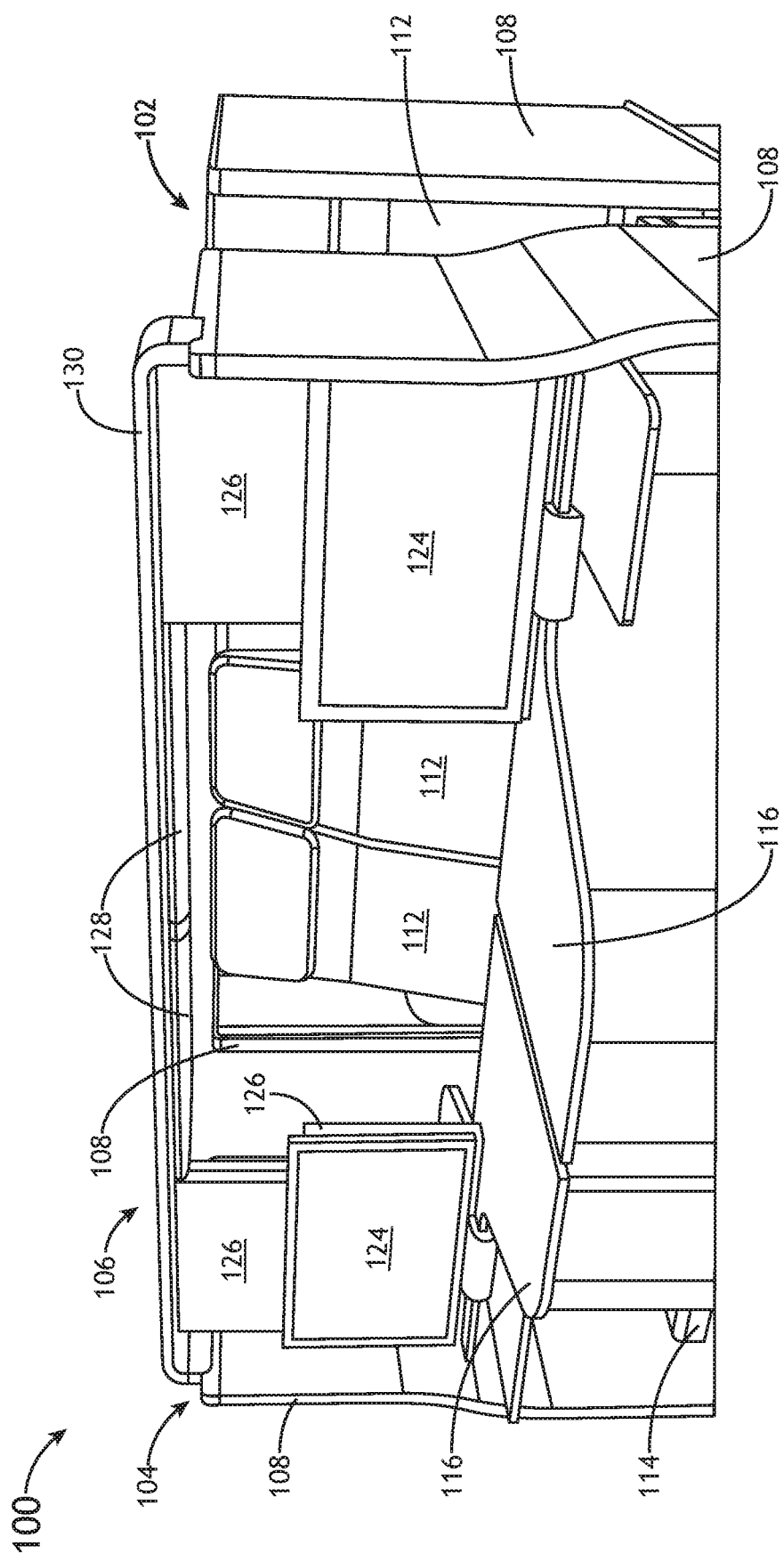
FIG. 2B illustrates an aircraft compartment passenger suite, in accordance with one or more embodiments of the disclosure.
Figure 2C:
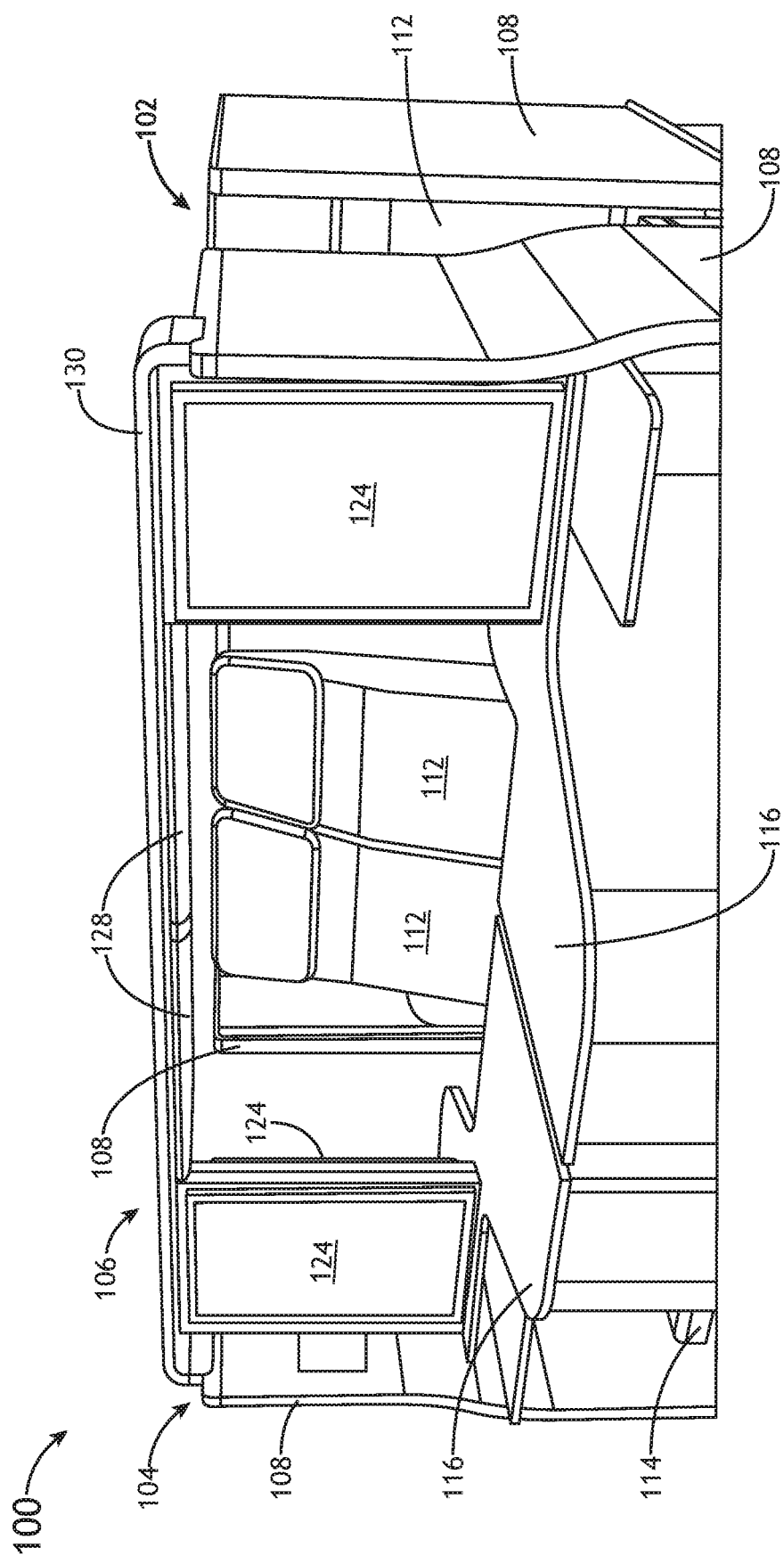
FIG. 2C illustrates an aircraft compartment passenger suite, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1A-7 generally illustrate stowage mechanisms for display devices of aircraft passenger compartment suites, in accordance with one or more embodiments of the disclosure.

An aircraft passenger compartment suite may include one or more seats. In select arrangements where there are multiple seats, the multiple seats may be separated by a privacy divider. In addition, the multiple seats may face the privacy divider, which may be opened a select amount to allow for interaction between passengers. Opening the privacy divider may require re-positioning one or more divider panels of the privacy divider and/or re-positioning one or more display devices in the aircraft passenger compartment suite.

Select known mechanisms for relocating the display devices include lateral slide mechanisms. The lateral slide mechanisms, however, may be heavy, especially ones necessary to counteract the weight of larger display devices. In addition, the mechanisms may result in a limited ability to open up the privacy divider (e.g., due to the horizontal dimensions of the display devices).

As such, it would be beneficial to provide stowage mechanisms with a lower weight than the select known mechanisms used to move the display devices. In addition, it would be beneficial to provide stowage mechanisms that reduce and/or eliminate lateral motion of display devices (e.g., to increase an opening in the privacy divider through which passengers may interact). Further, it would be beneficial to provide stowage mechanisms that allow for viewing of the display devices when in the stowed position.

FIGS. 1A-2C illustrate an aircraft passenger compartment suite 100, in accordance with one or more embodiments of the disclosure.

The aircraft passenger compartment suite 100 may include one or more sides. For example, the aircraft passenger compartment suite 100 may include a side 102 and a side 104 separated by a privacy divider 106. The aircraft passenger compartment suite 100 may include one or more passenger compartments 100a. For example, the aircraft passenger compartment suite 100 may include one or more passenger compartments 100a within the side 102 and/or one or more passenger compartments 100a within the side 104.

The aircraft passenger compartment suite 100 may include one or more privacy shell elements 108. The one or more privacy shell elements 108 may be configured to provide an opening 110 into the side 102 and/or the side 104. The aircraft passenger compartment suite 100 may include a door for the opening 110. The door may swing or slide into an open position against a privacy shell element 108. It is noted herein, however, that a privacy shell element 108 may be at least partially hollow. For example, the door may be slid into a cavity defined in the one or more privacy shell elements 108.

The side 102 and/or the side 104 may include one or more aircraft seats 112. For example, the side 102 and/or the side 104 may include one aircraft seat 112. By way of another example, the side 102 and/or the side 104 may include two aircraft seats 112. A privacy shell element 108 may be configured to receive at least a portion of the aircraft seat 112. For example, the privacy shell element 108 may be configured to receive a seat back of the aircraft seat 112.

To allow for a more compact configuration of the aircraft seats 112 in the aircraft passenger compartment suite 100, the one or more aircraft seats 112 in the side 102 may be offset from (e.g., not directly across from) the one or more aircraft seats 112 in the side 104. It is noted herein, however, the one or more aircraft seats 112 in the side 102 may be directly across from the one or more aircraft seats 112 in the side 104, where configuration of the aircraft passenger compartment suite 100 allows.

The side 102 and/or the side 104 may include one or more ottomans 114. For example, the side 102 and the side 104 may include an ottoman 114 positioned a select distance from each aircraft seat 112. By way of another example, the ottoman 114 may be positioned within a footwell. For instance, one or more dimensions of the footwell may be changed by transitioning the aircraft seat 112 between an upright position, a recline position, and/or a lie-flat position. It is noted herein that a portion of the ottoman 114 may be actuatable (e.g., along a set of tracks or linear rails) to a position outside of the footwell.

To allow for a more compact configuration of the one or more ottomans 114 in the aircraft passenger compartment suite 100, the one or more ottomans 114 in the side 102 may be offset from (e.g., not directly across from) the one or more ottomans 114 in the side 104. It is noted herein, however, the one or more ottomans 114 in the side 102 may be directly across from the one or more ottomans 114 in the side 104, where configuration of the aircraft passenger compartment suite 100 allows.

The one or more ottomans 114 may be configured to translate and/or rotate about an axis through a sidewall of the ottoman to point a top surface to a passenger occupying the aircraft seat 112. For example, where an ottoman 114 may be configured to both translate and rotate, the ottoman 114 may be configured to independently rotate and/or translate. By way of another example, where an ottoman 114 may be configured to both translate and rotate, a rotation may prevent further translation until the ottoman 114 is returned to a select position and/or a translation may prevent further rotation until the ottoman 114 is returned to a select position.

A particular aircraft seat 112 and an ottoman 114 may form a bed when the aircraft seat 112 and the ottoman 114 are each in a lie-flat or bed position. It is noted herein, however, the aircraft seat 112 and/or the ottoman 114 may be limited to an upright position and/or one or more recline positions. In addition, it is noted herein the aircraft seat 112 may be the sole component forming a bed when the aircraft seat 112 is in a lie-flat or bed position.

The aircraft seat 112 may be translatable (e.g., trackable or slidable). The aircraft seat 112 may be rotatable about an axis crosswise through the aircraft seat 112 into a position including, but not limited to, an upright or raised position, one or more reclined positions, and/or a lie-flat or bed position. The aircraft seat 112 may be rotatable about an axis (e.g., swivelable). The aircraft seat 112 may be fully positionable between the outer limits of motion as defined by the moveable components of the aircraft seat 112, and/or other monuments of the side 102 and/or the side 104. It is noted herein a fully upright or raised position may be considered a taxi, takeoff, or landing (TTOL) position during select stages of flight (though the upright position is not limited to use during the select stages of flight as the TTOL position, but also may be used at any point during the flight), for purposes of the present disclosure. In addition, it is noted herein that any position that does not meet the above-defined requirements of the TTOL position may be considered a non-TTOL position, for purposes of the present disclosure. Further, it is noted herein the aircraft seat 112 may be actuatable (e.g., translatable and/or rotatable) from the TTOL position to a non-TTOL position, and/or vice versa.

The side 102 and/or the side 104 may include one or more monuments 116. For example, a monument 116 may include, but are not limited to, a side stand, a tray or table, or the like. A monument 116 may include an accessible surface for a passenger occupying the side 102 or the side 104.

The side 102 and/or the side 104 may include a tray 118 for each aircraft seat 112. The tray 118 may include a top surface, a bottom surface, and one or more side surfaces. For example, the tray 118 may include a single continuous side surface where all corners are rounded. By way of another example, the tray 118 may include up to an N number of side surfaces where the tray 118 includes up to an N number of corners.

The tray 118 may be coupled to the privacy divider 106. The tray 118 may be configured to extend a select distance from a stowed position (e.g., under the privacy divider 106) to an extended position proximate to a passenger in an aircraft seat 112. The tray 118 may be coupled to a monument 116.

The side 102 and/or the side 104 may include one or more lights 120. For example, the one or more lights 120 may be coupled to and/or partially inset in the one or more privacy shell elements 108.

The side 102 and/or the side 104 may include one or more stowage compartments 122. For example, a stowage compartment 122 may include a door. By way of another example, a stowage compartment 122 may be configured to receive and hold (e.g., contain, secure, or the like) one or more passenger amenities including, but not limited to, one or more pieces of carry-on luggage, paper-printed materials (e.g., magazines, newspapers, pamphlets, or the like), select personal electronic devices (e.g., phones, tablets, phablets, laptops, music devices, digital video disc (DVD) players, handheld gaming consoles or devices, or the like), food products, drink products, or the like. By way of another example, a stowage compartment 122 may include one or more electronic connections for one or more passenger amenities such as, but not limited to, one or more charging ports, one or more charging cables, or the like. By way of another example, a stowage compartment 122 may include one or more electronic connections in communication with one or more components of the aircraft passenger compartment suite 100 such as, but not limited to, one or more display device connection ports, one or more display device connection cables, one or more audio output jacks (e.g., headphone jacks), one or more audio input jacks, or the like. By way of another example, a stowage compartment 122 may include one or more safety devices (e.g., air masks, personal floatation devices, or the like). The one or more stowage compartments 122 may be coupled to and/or at least be partially inset in the one or more privacy shell elements 108, the one or more monuments 116, or the like.

The side 102 and/or the side 104 may include one or more passenger in-flight entertainment devices (IFEs). For example, the one or more IFEs may include, but are not limited to, one or more display devices 124 coupled to the privacy divider 106. For example, the one or more display devices 124 may include a non-collapsible screen (e.g., a monitor, a television, or the like) configured to receive a signal, generate an output based on the signal, and display the output to a passenger in an aircraft seat 112. The one or more display devices 124 may be actuatable from a deployed position to a stowed position.

To allow for a more compact configuration of the one or more display devices 124 in the aircraft passenger compartment suite 100, the one or more display devices 124 in the side 102 may be offset from (e.g., not directly across from) the one or more display devices 124 in the side 104. It is noted herein, however, the one or more display devices 124 in the side 102 may be directly across from the one or more display devices 124 in the side 104, where configuration of the aircraft passenger compartment suite 100 allows.

One or more actuatable panels 126, 128 may be supported by a bridge 130 of the privacy divider 106. The one or more actuatable panels 126, 128 may be configured to be flush with a bezel of the one or more display devices 124 so as to prevent the bezel of the one or more display devices 124 from being grabbed onto by a passenger in the aircraft passenger compartment suite 100 (e.g., when moving, in the case of an emergency, or the like). It is noted herein the one or more display devices 124 and any actuation assemblies coupling the one or more display devices 124 to the privacy divider 106 may need to meet aviation guidelines and/or regulations, should the passenger in the aircraft passenger compartment suite 100 be able to grab onto the bezel of the one or more display devices 124.

The one or more actuatable panels 126, 128 may be actuated from a deployed position to a stowed position. For example, the one or more actuatable panels 126 may be stowed (e.g., via a lateral slide mechanism or a rotation mechanism) when the one or more display devices 124 are in the stowed position and the passengers of the aircraft passenger compartment suite 100 wish to open the privacy divider 106 between the side 102 and the side 104. By way of another example, the one or more actuatable panels 128 may be actuated upward (e.g., flipped upward about an axis through a top edge of the one or more actuatable panels 128, raised or lifted upward via a slide mechanism, rolled up, or the like) when the one or more display devices 124 are in the stowed position and the passengers of the aircraft passenger compartment suite 100 wish to open the privacy divider 106 between the side 102 and the side 104.

Although embodiments of the disclosure illustrate the use of one or more actuatable and non-collapsible panels 126, 128, it is noted herein the one or more actuatable panels 126, 128 may be collapsible. For example, the actuatable and collapsible panels 126, 128 may include, but is not limited to, a roll-up screen or shade, a side-collapsible screen or shade, a set of curtains, or other collapsible material that is moveable when it is desired that privacy between the side 102 and the side 104 be created or removed. The actuatable and collapsible panels 126, 128 may be drawn to the side proximate to a privacy shell element 108. The actuatable and collapsible panels 126, 128 may be raised into the bridge 130. The actuatable and collapsible panels 126, 128 may be lowered into a monument 116 of the privacy divider 106. The actuatable and collapsible panels 126, 128 may be held in place with rope, a hook, or other device configured to secure the actuatable and collapsible panels 126, 128 in the stowed position. In this regard, the total weight of components such as the privacy divider 106 may be reduced.

It is noted herein that the privacy divider 106 may be considered closed when at least one of the one or more display devices 124 of the side 102, the one or more display devices 124 of the side 104, and/or the one or more activatable panels 126, 128 are in the deployed position. For example, the privacy divider 106 may be considered closed when the one or more display devices 124 of the side 102, the one or more display devices 124 of the side 104, and the one or more actuatable panels 126, 128 are in the respective deployed positions. By way of another example, the privacy divider 106 may be considered open when the one or more display devices 124 of the side 102 and the one or more display devices 124 of the side 104 are in the respective deployed positions.

In addition, it is noted herein that the privacy divider 106 may be considered open when at least one of the one or more display devices 124 of the side 102, the one or more display devices 124 of the side 104, and/or the one or more actuatable panels 126, 128 are in the stowed position. For example, the privacy divider 106 may be considered open when the one or more display devices 124 of the side 102, the one or more display devices 124 of the side 104, and the one or more actuatable panels 126, 128 are in the respective stowed positions. By way of another example, the privacy divider 106 may be considered open when the one or more display devices 124 of the side 102 and the one or more display devices 124 of the side 104 are in the respective stowed positions.

It is noted herein the translation of the one or more panels 126, 126 and/or the rotation of the one or more display devices 124 may be assisted by one or more actuation devices. For example, the one or more actuation devices may include, but is not limited to, one or more springs (e.g., gas springs, mechanical springs, or the like), one or more actuators (e.g., solenoids, servo motors, or the like), and/or one or more mechanical assemblies driven by an actuator (e.g., one or more gear assemblies such as a worm gear-and-wheel assembly or a rack-and-pinion assembly, one or more chain-and-sprocket assemblies, one or more belt-and-pulley assemblies, or the like).

In addition, it is noted herein the one or more display devices 124 and/or the one or more actuatable panels 126, 128 may be unlocked from the stowed position via a manual latching or locking assembly (e.g., a push-to-release latch, or the like). For example, the manual latching or locking assembly may be situated directly on an actuation assembly of the one or more display devices 124 and/or situated directly on the one or more actuatable panels 126, 128. By way of another example, the manual latching locking assembly may have one or more components situated elsewhere in or proximate to the aircraft passenger compartment suite 100 (e.g., on the aircraft seat 112, on a monument 116, on an exterior surface of a privacy shell element 108, or the like). In the instance where the components are situated on an exterior surface of a privacy shell element 108 or elsewhere outside the aircraft passenger compartment suite 100, a passenger of the aircraft passenger compartment suite 100 may need to request the actuation be performed by a crew member. The one or more display devices 124 and/or the one or more actuatable panels 126, 128 may be unlocked from the stowed position via an electronic latching or locking assembly.

Although embodiments of the disclosure illustrate the one or more actuatable panels 126 and the display device 124 as separate components, it is noted herein the one or more actuatable panels 126 may be coupled to a rear surface of the one or more display devices 124, either directly (e.g., coupled together) or indirectly (e.g., tied together via a cam follower assembly including a cam follower in a cam-shaped track) for a smooth transition. In addition, it is noted herein the one or more actuatable panels 126 may be integrated with (e.g., form) the rear surface of the display device 124. In this regard, the one or more actuatable panels 126 may rotate with the display device 124. In addition, although embodiments of the disclosure illustrate the one or more actuatable panels 126, 128 as separate components, it is noted herein the one or more actuatable panels 126, 128 may be tied together (e.g., via a cam follower assembly including a cam follower in a cam-shaped track) for a smooth transition. Therefore, the above description should not be interpreted as a limitation on the scope of the disclosure but merely an illustration.

The aircraft passenger compartment suite 100 may include one or more speakers configured to provide accompanying sound to media content being displayed on a display device 124 (e.g., a display device 124 in the side 102, a display device 124 in the side 104, and/or a display device shared between the side 102 and the side 104).

Although embodiments of the disclosure illustrate the aircraft passenger compartment suite 100 as including sides 102, 104, with each side including one or more aircraft seats 112, the aircraft passenger compartment suite 100 may include a single side with one or more aircraft seats 112. For example, the aircraft passenger compartment suite 100 may be bounded by privacy shell elements 108, instead of having the privacy divider 106, such that there is only one side with one or more aircraft seats 112. It is noted herein that any embodiments related to the aircraft passenger compartment suite 100 including sides 102, 104 may be extended to apply to an aircraft passenger compartment suite 100 with a single side. Therefore, the above description should not be interpreted as a limitation on the scope of the disclosure but merely an illustration.

Figure 3A:
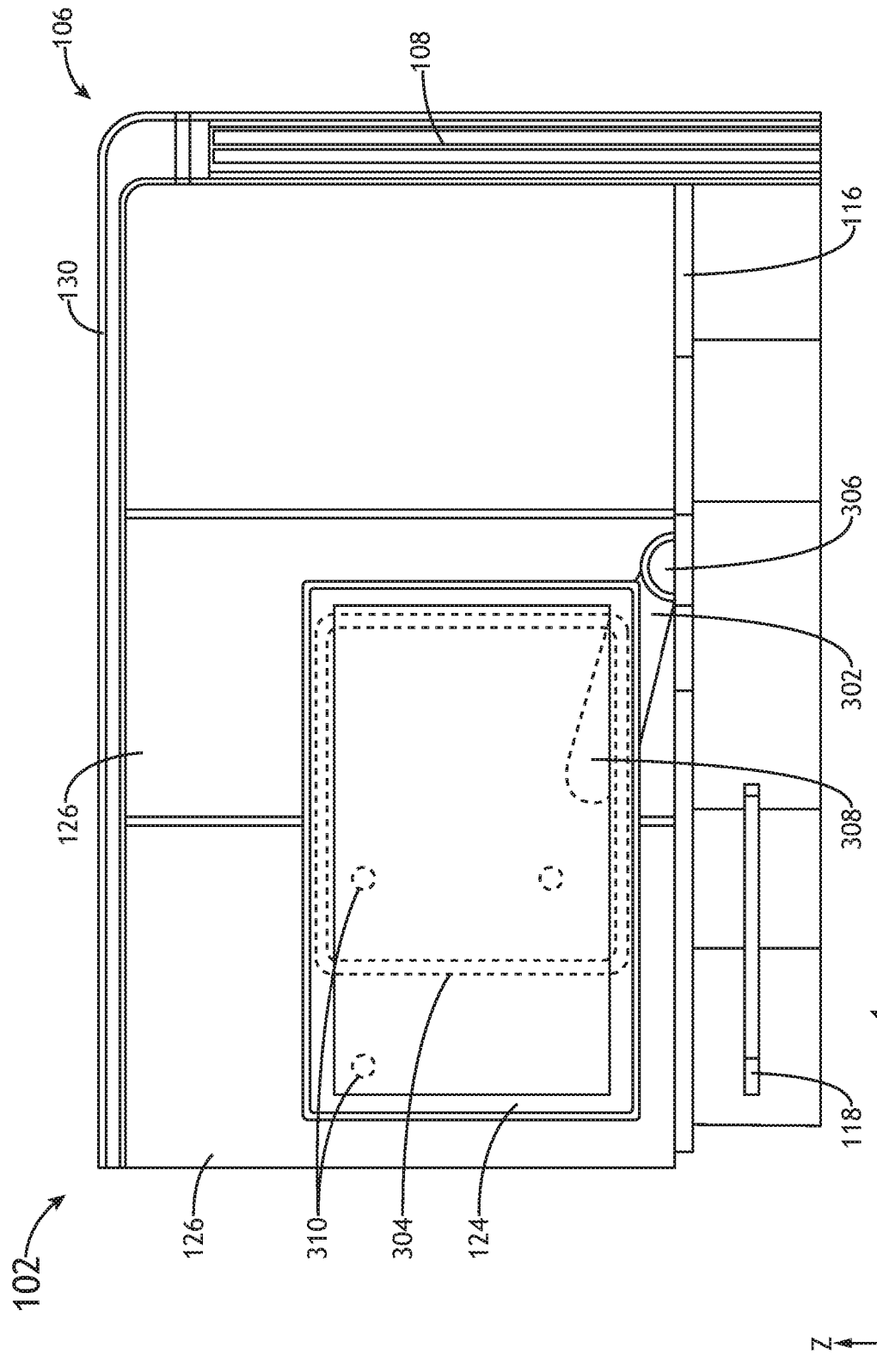
FIG. 3A illustrates a display device and a set of privacy divider panels of an aircraft compartment passenger suite, in accordance with one or more embodiments of the disclosure.
Figure 3B:
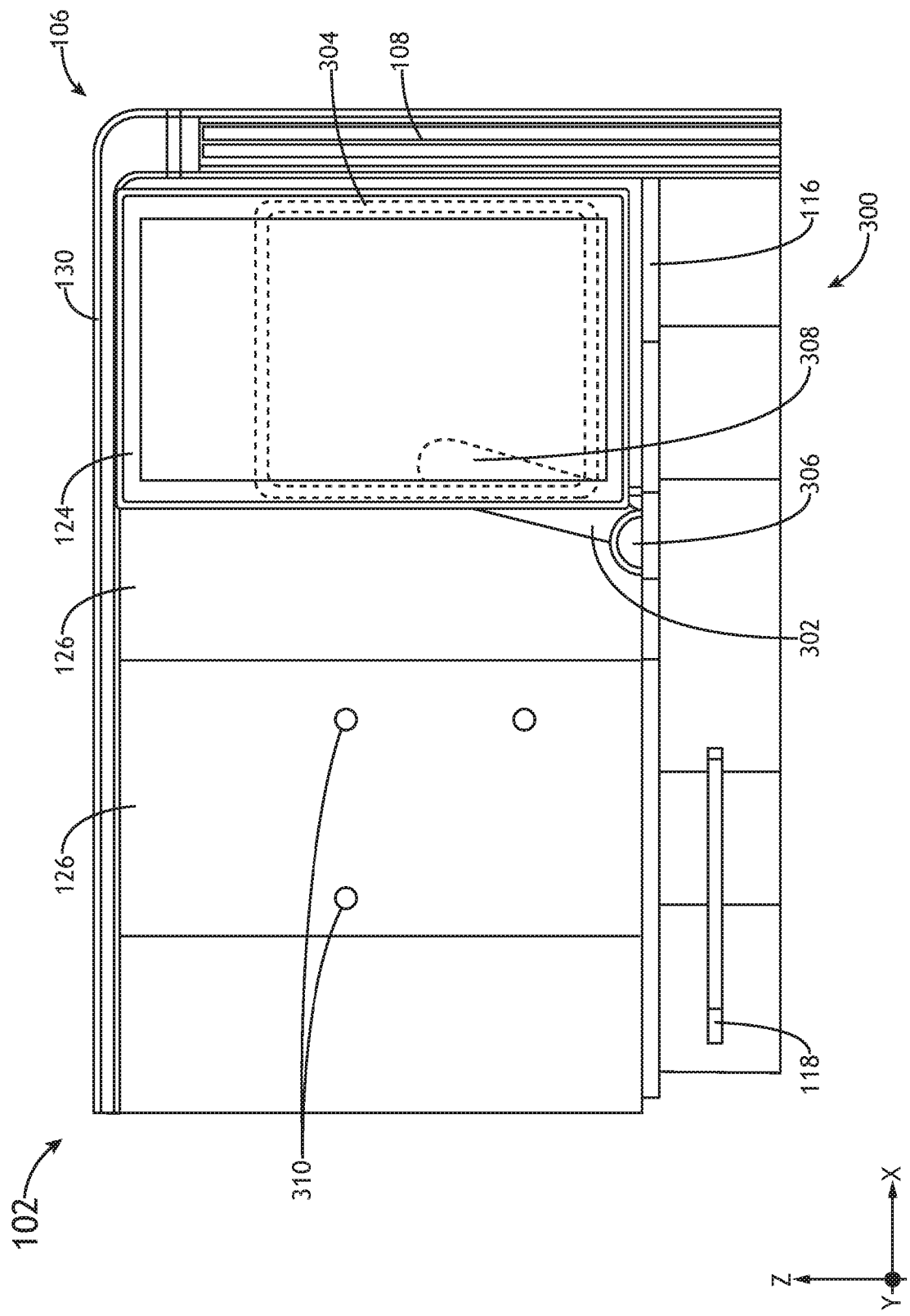
FIG. 3B illustrates a display device and a set of privacy divider panels of an aircraft compartment passenger suite, in accordance with one or more embodiments of the disclosure.
Figure 3C:
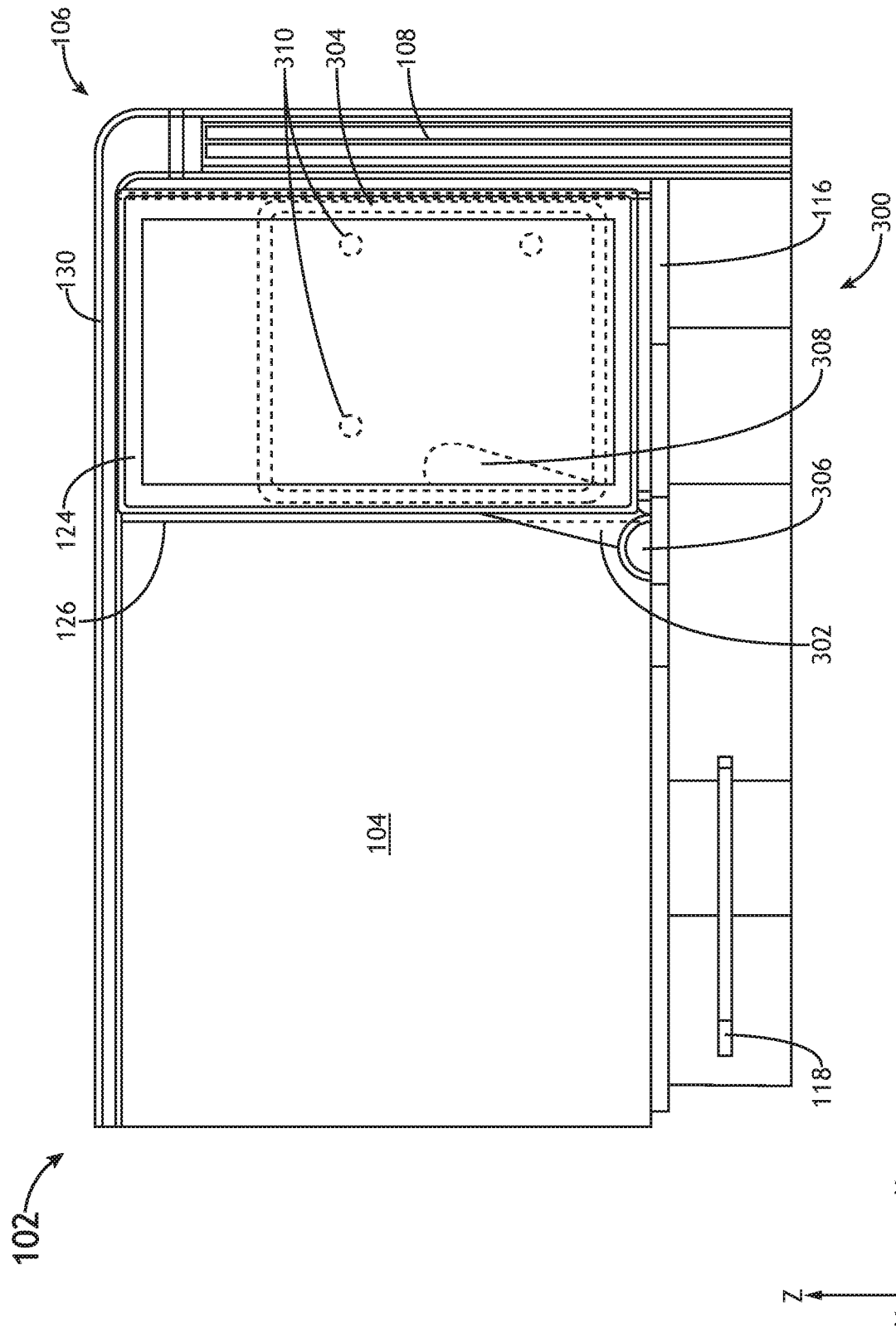
FIG. 3O illustrates a display device and a set of privacy divider panels of an aircraft compartment passenger suite, in accordance with one or more embodiments of the disclosure.

FIGS. 3A-3C generally illustrate an actuation of a display device 124 and an actuation of one or more panels 126 of the privacy divider 106, in accordance with one or more embodiments of the disclosure. For example, the display device 124 may be positioned in the side 102 of the aircraft passenger compartment suite 100.

As illustrated in FIG. 3A, the display device 124 may be set in a deployed position. The display device 124 may be in a landscape orientation when in the deployed position. The one or more panels 126 of the privacy divider 106 may prevent access to the side 104 when in the deployed position.

As illustrated in FIG. 3B the display device 124 may be configured to actuate between the deployed position and a stowed position. For example, the display device 124 may be rotated 90 degrees between the landscape orientation and the portrait orientation. The display device 124 may be in a portrait orientation when in the stowed position.

The display device 124 may be coupled to an actuation assembly 300. It is noted herein that actuation assembly 300, stowage mechanism 300, display device actuation assembly 300, and display device stowage mechanism 300 may be considered equivalent, for purposes of the present disclosure.

The actuation assembly 300 may include an arm 302. The arm 302 may be coupled to the privacy divider 106 via a coupler 306. The arm 302 may allow for the display device 124 to be rotated about an axis through the coupler 306 (e.g., an axis through a panel 126 of the privacy divider 106, or an x-z plane) from a deployed footprint into a stowed footprint.

The actuation assembly 300 may include an actuation plate 304 configured to couple to the display device 124. The arm 302 may be coupled to the actuation plate 304 via a coupler 308. For example, the coupler 308 may be a fixed coupler, such that the actuation plate 304 (and/or the display device 124) does not rotate about an axis through the coupler 308 (e.g., an axis through a panel 126 of the privacy divider 106, or an x-z plane). It is noted herein the coupler 308 may allow for rotation in addition to the rotation about the axis through the coupler 306. In this regard, which edge forms a bottom edge of the display device 124 when in the stowed position may depend on whether the coupler 308 allows for rotation in addition to the rotation about the axis through the coupler 306.

Although embodiments of the disclosure illustrate the arm 302 being coupled to the plate 304, it is noted herein the actuation plate 304 may not be a required component of the actuation assembly 300, and the arm 302 may be directly coupled to the display device 124. Therefore, the above description should not be interpreted as a limitation on the scope of the disclosure but merely an illustration.

As illustrated in FIG. 3C, the one or more panels 126 of the privacy divider 106 may actuate from the deployed position to a stowed position. For example, the one or more panels 126 may independently translate along a rail assembly from the rotation of the display device 124. By way of another example, the translation of the one or more panels 126 and the rotation of the display device 124 may be tied together (e.g., via a cam follower assembly including a cam follower in a cam-shaped track) for a smooth transition.

The display device 124 may be docked when in the deployed position and/or the stowed position to prevent unintended actuation of the display device 124. For example, the privacy divider 106 may include one or more anchor points 310 configured to secure the display device 124 by engaging the actuation plate 304 (or the display device 124, where there is no actuation plate 304) and preventing the display device 124 from actuating. By way of another example, the actuation plate 304 (or the display device 124, where there is no actuation plate 304) may include one or more anchor points 310 configured to secure the display device 124 by engaging the one or more panels 126 of the privacy divider 106 and preventing the display device 124 from actuating. Where the translation of the one or more panels 126 and the rotation of the display device 124 are tied together, the disengaging and/or engaging of the one or more anchor points 310 may be tied in with the translation of the one or more panels 126 and the rotation of the display device 124.

Docking the display device 124 with the one or more anchor points 310 when in the deployed position and/or the stowed position may reduce or eliminate the need for actuating harnesses and/or actuating mechanisms. For example, the display device 124 may be allowed to freely actuate between the deployed position and the stowed position without the assistance of actuating harnesses and/or actuating mechanisms, as the one or more anchor points 310 may reduce or eliminate the need for the actuating harnesses and/or actuating mechanisms to lock the display device 124 in the deployed position and/or the stowed position.

FIGS. 4A-4D generally illustrate an actuation of a display device 124 and an actuation of one or more panels 126 of the privacy divider 106, in accordance with one or more embodiments of the disclosure. For example, the display device 124 may be positioned in the side 104 of the aircraft passenger compartment suite 100.

As illustrated in FIG. 4A, the display device 124 may be set in a deployed position. The display device 124 may be in a landscape orientation when in the deployed position. The one or more panels 126 of the privacy divider 106 may prevent access to the side 102 when in the deployed position.

Figure 4B:
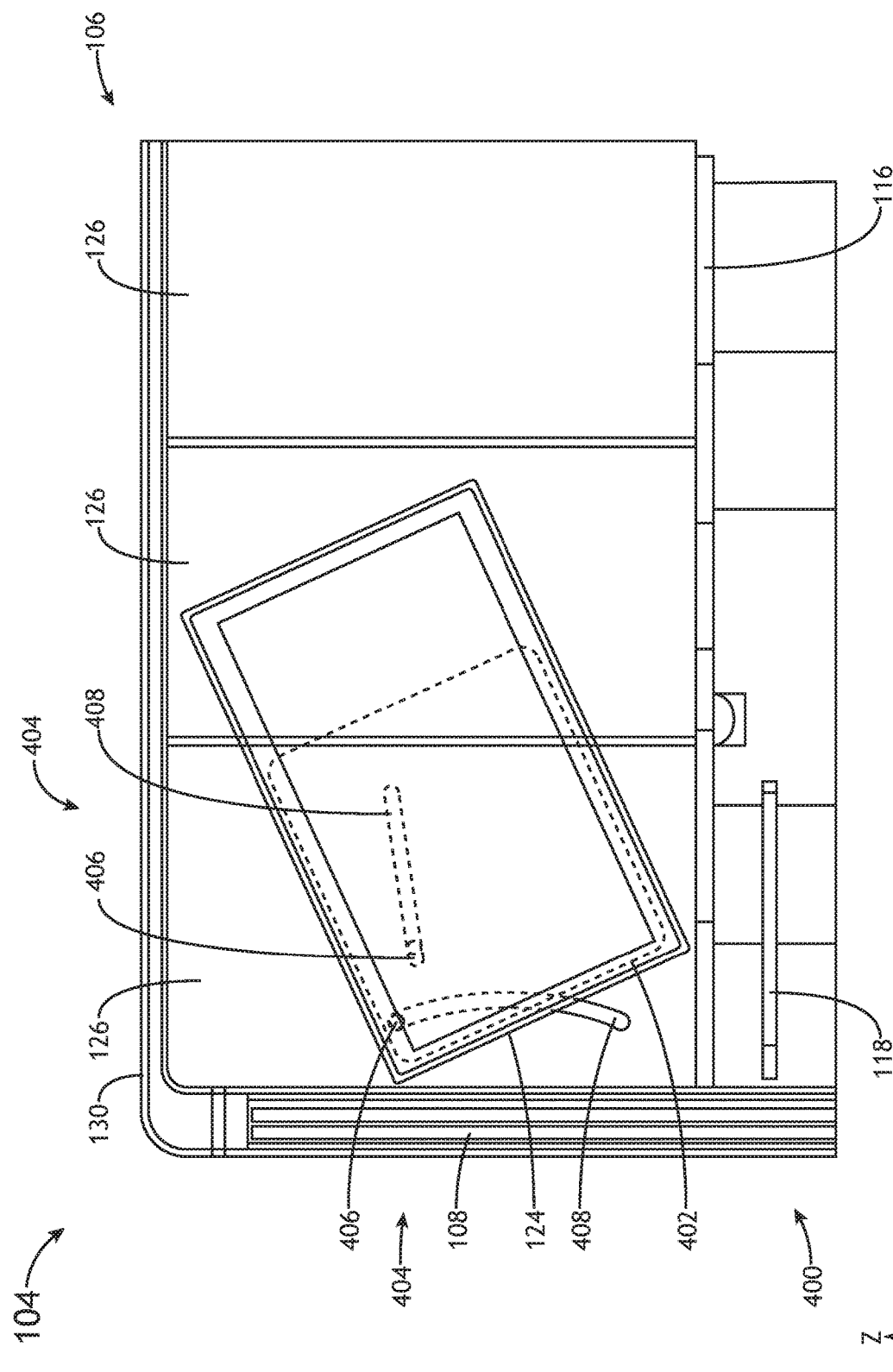
FIG. 4B illustrates a display device and a set of privacy divider panels of an aircraft compartment passenger suite, in accordance with one or more embodiments of the disclosure.
Figure 4C:
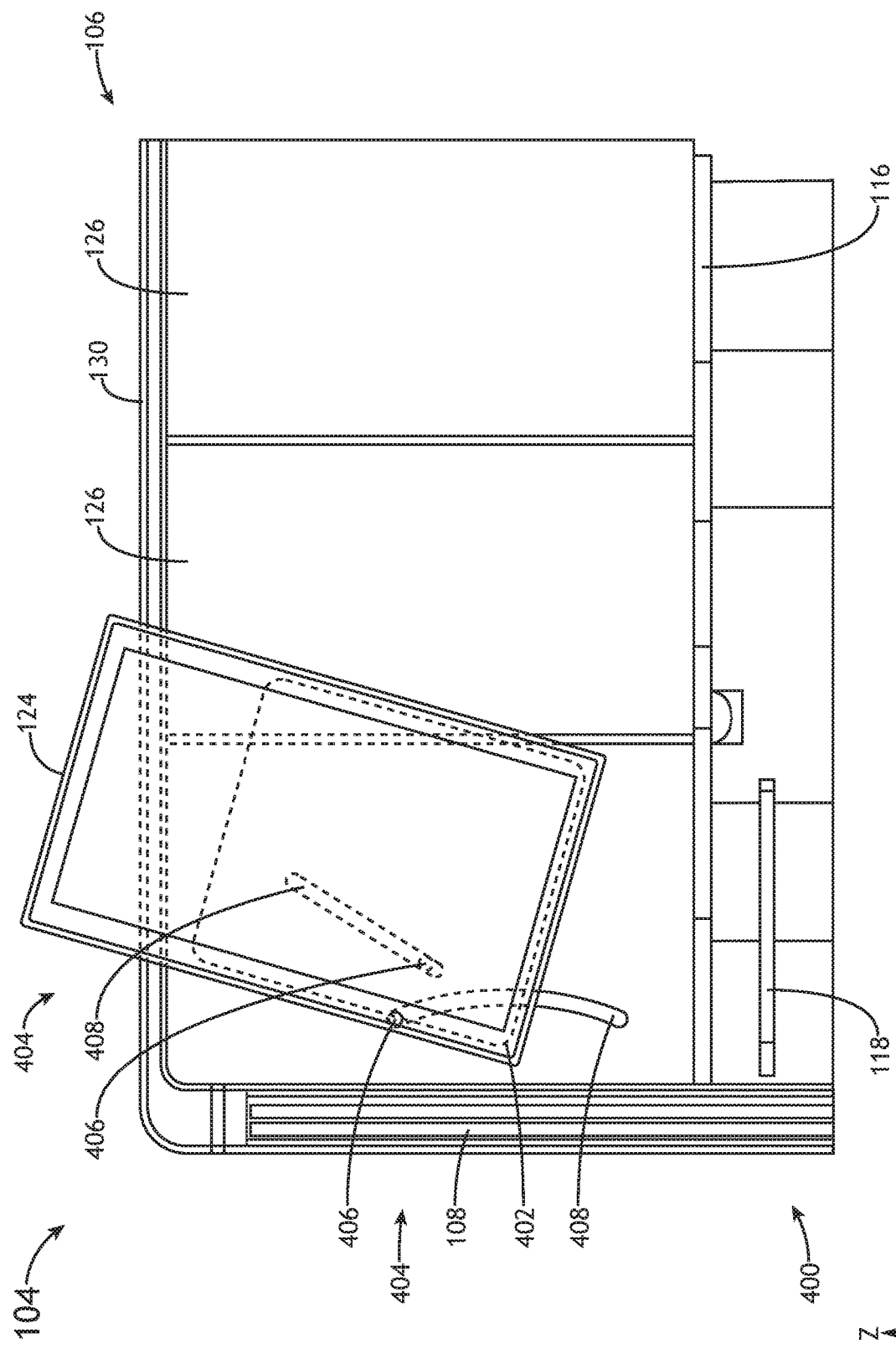
FIG. 4C illustrates a display device and a set of privacy divider panels of an aircraft compartment passenger suite, in accordance with one or more embodiments of the disclosure.

As illustrated in FIGS. 4B and 4C, the display device 124 may be configured to actuate between the deployed position and a stowed position. For example, the display device 124 may be rotated 90 degrees between the landscape orientation and the portrait orientation. The display device 124 may be in a portrait orientation when in the stowed position.

The display device 124 may be coupled to an actuation assembly 400. It is noted herein that actuation assembly 400, stowage mechanism 400, display device actuation assembly 400, and display device stowage mechanism 400 may be considered equivalent, for purposes of the present disclosure.

The actuation assembly 400 may include an actuation plate 402 configured to couple to the display device 124. It is noted herein, however, that the actuation plate 402 may not be a required component of the actuation assembly 400. Therefore, the above description should not be interpreted as a limitation on the scope of the disclosure but merely an illustration.

The actuation assembly 400 may include one or more track assemblies 404. A track assembly 404 of the one or more track assemblies 404 may include a pin 406 configured to run along a track 408 during actuation of the display device 124 between the deployed position and the stowed position. For example, the pin 406 may be coupled to the actuation plate 402 (or to the display device 124, where there is no actuation plate 402) and the track 408 may be cut in, or attached to, the panel 126 of the privacy divider 106. By way of another example, the track 408 may be cut into the actuation plate 402 (or in a rear surface of the display device 124, where there is no actuation plate 402) and the pin 406 may be coupled to a panel 126 of the privacy divider 106. The track assemblies 404 may allow for the display device 124 to be rotated within a single, footprint about an axis (e.g., an axis through itself and/or an axis through a panel 126 of the privacy divider 106, or an x-z plane).

In one example, the actuation assembly 400 may include two track assemblies 404 with a curved track 408 and a straight track 408 set at an angle relative to the curved track 408, where the combination of the curved track 408 and the straight track 408 may allow for a rotation of the display device 124 in the single footprint about an axis (e.g., an axis through itself and/or an axis through a panel 126 of the privacy divider 106, or an x-z plane). It is noted herein, however, that the actuation assembly 400 may include any number of track assemblies 404.

In this regard, the rotation of the display device 124 may be reduced in an effort to increase the amount of space between the display devices 124 on the side 104, which in turn may increase an amount of open area in the privacy divider 106.

Figure 4D:
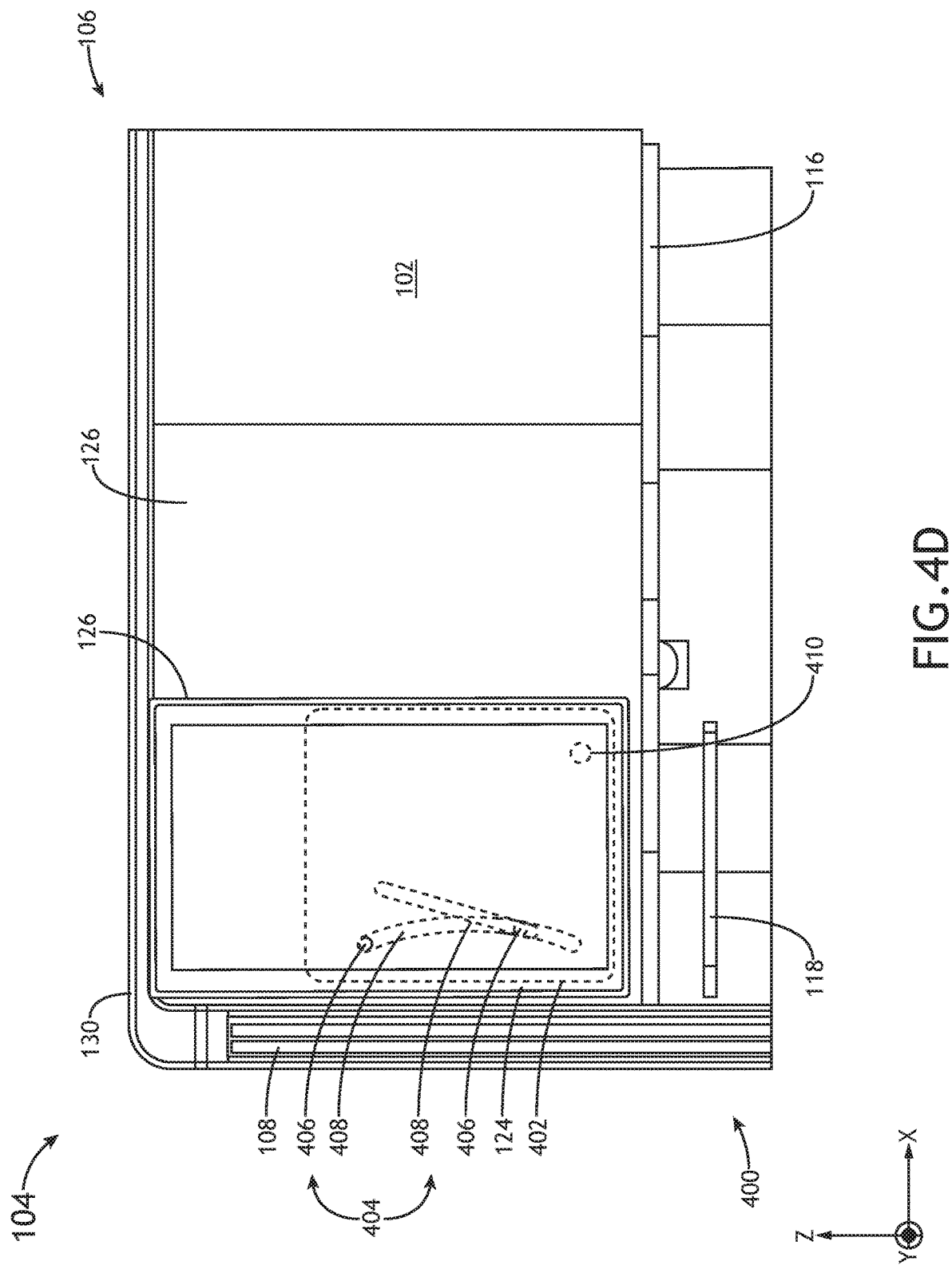
FIG. 4D illustrates a display device and a set of privacy divider panels of an aircraft compartment passenger suite, in accordance with one or more embodiments of the disclosure.
Figure 4E:
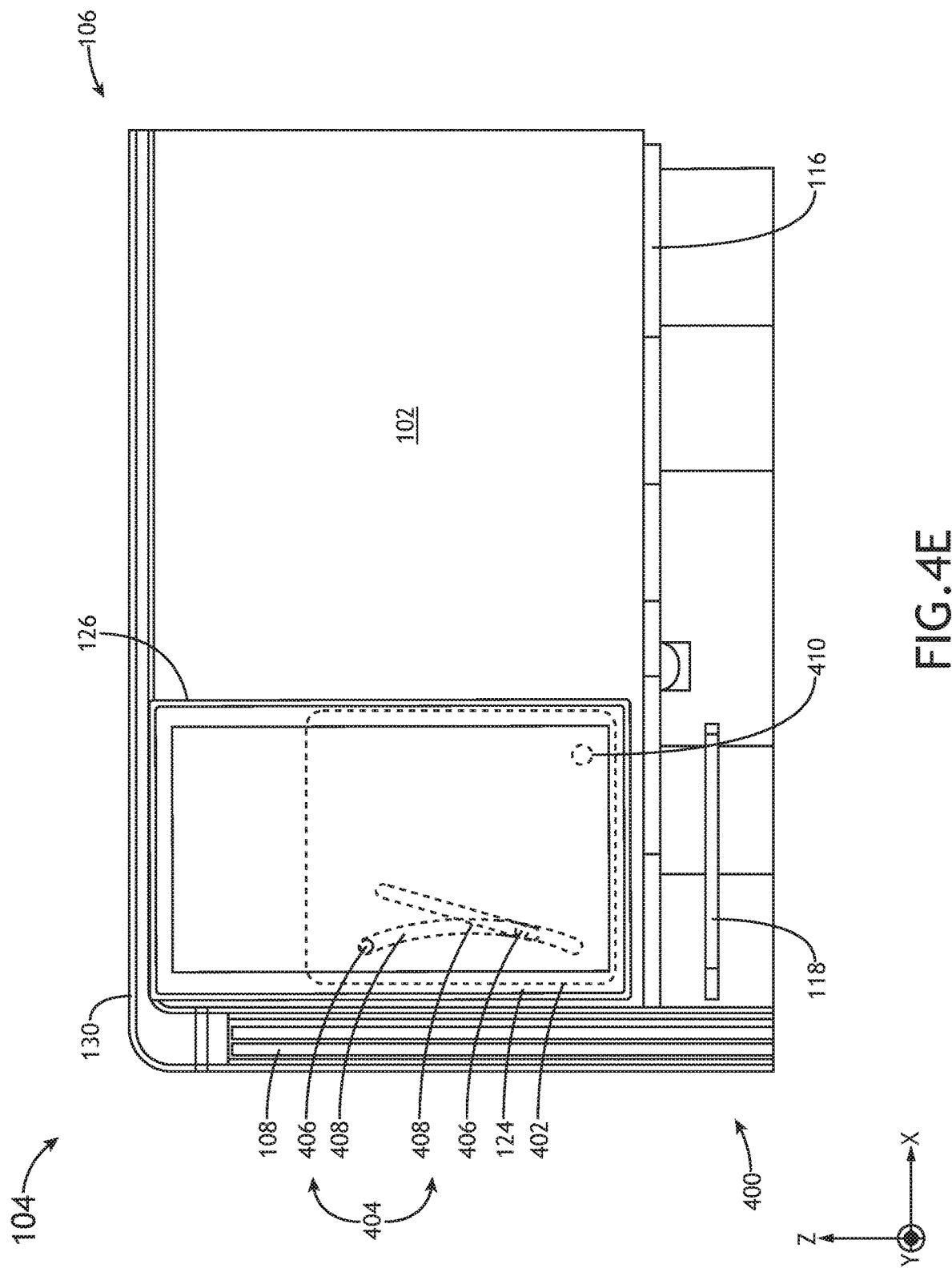
FIG. 4E illustrates a display device and a set of privacy divider panels of an aircraft compartment passenger suite, in accordance with one or more embodiments of the disclosure.

As illustrated in FIG. 4D, the one or more panels 126 of the privacy divider 106 may actuate from the deployed position to a stowed position. For example, the one or more panels 126 may independently translate along a rail assembly from the rotation of the display device 124. By way of another example, the translation of the one or more panels 126 and the rotation of the display device 124 may be tied together (e.g., via a cam follower assembly including a cam follower in a cam-shaped track) for a smooth transition.

The display device 124 may be docked when in the deployed position and/or the stowed position to prevent unintended actuation of the display device 124. For example, the privacy divider 106 may include one or more anchor points 410 configured to secure the display device 124 by engaging the actuation plate 402 (or to the display device 124, where there is no actuation plate 402) and preventing the display device 124 from actuating. By way of another example, the actuation plate 402 (or the display device 124, where there is no actuation plate 402) may include one or more anchor points 410 configured to secure the display device 124 by engaging the one or more panels 126 of the privacy divider 106 and preventing the display device 124 from actuating. Where the translation of the one or more panels 126 and the rotation of the display device 124 are tied together, the disengaging and/or engaging of the one or more anchor points 410 may be tied in with the translation of the one or more panels 126 and the rotation of the display device 124.

Docking the display device 124 with the one or more anchor points 410 when in the deployed position and/or the stowed position may reduce or eliminate the need for actuating harnesses and/or actuating mechanisms. For example, the display device 124 may be allowed to freely actuate between the deployed position and the stowed position without the assistance of actuating harnesses and/or actuating mechanisms, as the one or more anchor points 410 may reduce or eliminate the need for the actuating harnesses and/or actuating mechanisms to lock the display device 124 in the deployed position and/or the stowed position.

It is noted herein that rotating the display device 124 from the landscape orientation to the portrait orientation, as illustrated in FIGS. 3A-3C and FIGS. 4A-4D, instead of sliding the display device 124 via a lateral motion may have a few benefits. For example, doing so may increase open area in the privacy divider 106. For instance, the combined width of the display devices 124 in the side 102 and the side 104 may be substantially similar to the width of the privacy divider 106 when the display devices 124 in the side 102 and the side 104 are in the deployed or landscape position. A width of the open area may be the portion of the width of the privacy divider 106 not covered by the display devices 124 in the side 102 and the side 104 when in the stowed position, as the display devices 124 in the side 102 and the side 104 would take up less width in the stowed or portrait position than in the deployed or landscape position.

By way of another example, weight may be reduced with the simplifying or eliminating of actuating harnesses (e.g., data cable harnesses) and/or actuating mechanisms (linkages, actuators, or the like), where the display device 124 is configured to dock in the deployed position and/or the stowed position via the anchor points 310, 410.

By way of another example, rotation of the display device 124 from a landscape mode when deployed to a portrait mode when stowed may cause the display device 124 to display multiple screens on the display device 124 when stowed. For instance, a primary graphical user interface (GUI) window may continue to display the original content being displayed when the display device 124 was in the landscape orientation, while a secondary GUI window may display new content (e.g., a menu for the passenger aircraft, call options to the crew members of the passenger aircraft, flight path location, advertising, controls for the aircraft passenger compartment suite, or the like).

Figure 5B:
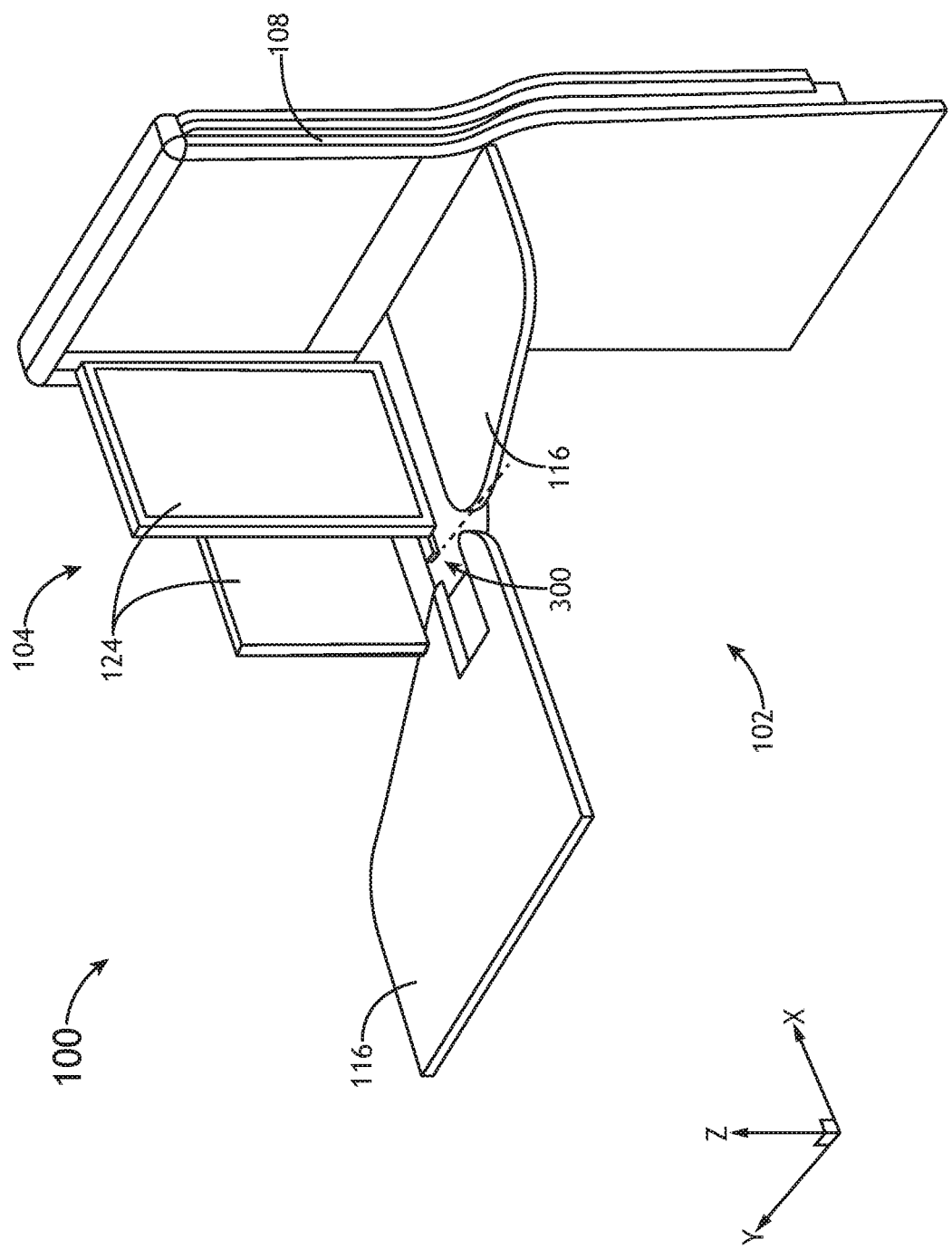
FIG. 5B illustrates a set of display devices and a privacy divider section of an aircraft compartment passenger suite, in accordance with one or more embodiments of the disclosure.
Figure 5C:
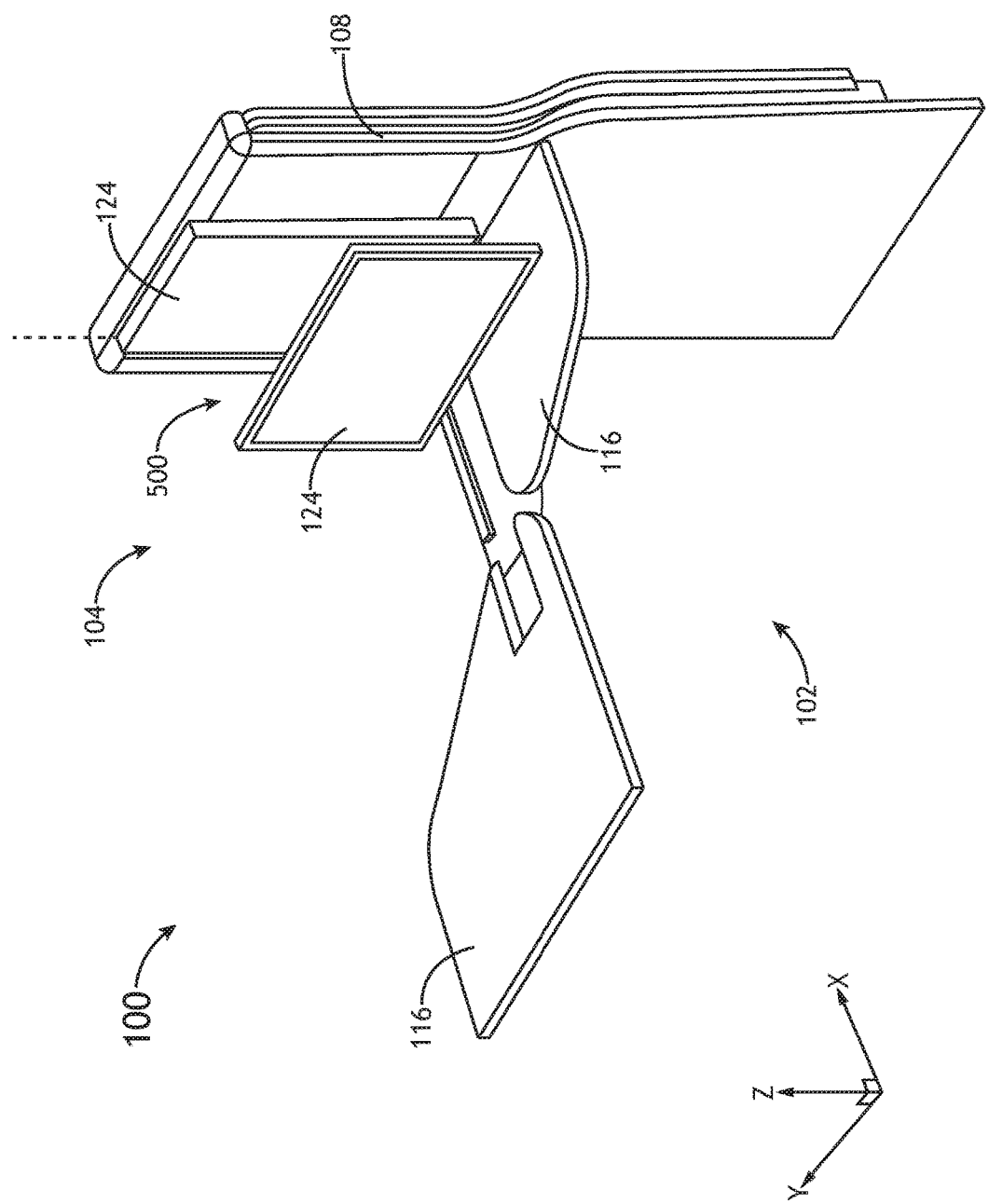
FIG. 5C illustrates a set of display devices and a privacy divider section of an aircraft compartment passenger suite, in accordance with one or more embodiments of the disclosure.

FIGS. 5A-5C generally illustrate an actuation of a first display device 124 and a second display device 124 of the aircraft passenger compartment suite 100, in accordance with one or more embodiments of the disclosure. For example, the first display device 124 may be positioned in the side 102 when in the deployed position, while the second display device 124 may be positioned in the side 104 when in the deployed position.

As illustrated in FIG. 5A, the display devices 124 may each be set in a deployed position. The display devices 124 may be in a landscape orientation when in the deployed position.

As illustrated in FIG. 5B, the display device 124 of the side 102 may be configured to actuate between the deployed position and a first stowed position. The display device 124 of the side 102 may be in a portrait orientation when in the stowed position. The display device 124 of the side 102 may rotate about an axis (e.g., an axis through the display device 124, or an x-z plane). In one example, the display device 124 of the side 102 may be coupled to an actuation assembly 300 similar to that described with respect to FIGS. 3A-3C.

As illustrated in FIG. 5C, the rotated display device 124 of the side 102 may be configured to actuate between the first stowed position and a second stowed position, while the display device 124 of the side 104 may be configured to actuate between the deployed position and a stowed position. For example, the rotated display device 124 of the side 102 and the display device 124 of the side 104 may be configured to actuate as a single unit. It is noted herein, however, that the rotated display device 124 of the side 102 may rotate to the second stowed position before the display device 124 of the side 104 rotates to the stowed position. Therefore, the above description should not be interpreted as a limitation on the scope of the disclosure but merely an illustration.

The display devices 124 may be coupled to an actuation assembly 500. It is noted herein that actuation assembly 500, stowage mechanism 500, display device actuation assembly 500, and display device stowage mechanism 500 may be considered equivalent, for purposes of the present disclosure.

The display devices 124 may rotate about an axis (e.g., an axis through a horizontal surface of a monument 116, or a x-y plane) via the actuation assembly 500. Following the rotation via the actuation assembly 500, the screen of the rotated display device 124 of the side 102 may face inward toward a surface of a privacy shell element 108, while the screen of the display device 124 of the side 104 may face outward into the aircraft passenger compartment suite 100. In this regard, the display device 124 of the side 104 may be shared by the passengers in both the side 102 and the side 104 of the aircraft passenger compartment suite 100.

It is noted herein that any description of the one or more components of the aircraft passenger compartment suite 100, including any components of the side 102, the side 104, and the privacy divider 106 (e.g., as described with respect to FIGS. 1A-1C) may be applied to FIGS. 5A-5C.

FIGS. 6A-6E generally illustrate an actuation of a display device 124 on the side 102 and a display device 124 on a side 104 of the aircraft passenger compartment suite 100, in accordance with one or more embodiments of the disclosure. For example, the first display device 124 may be positioned in the side 102 when in the deployed position, while the second display device 124 may be positioned in the side 104 when in the deployed position.

Figure 6A:
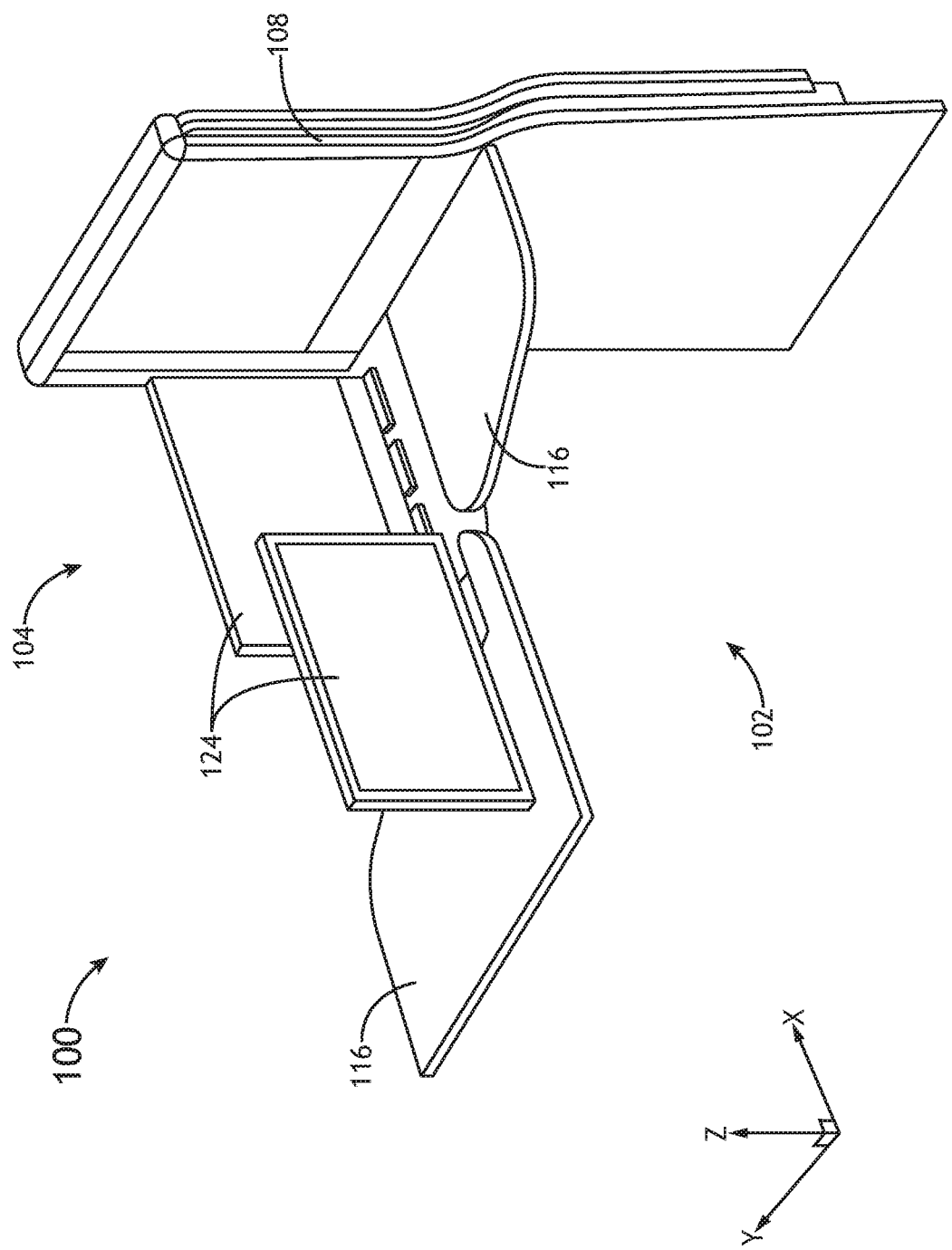
FIG. 6A illustrates a set of display devices and a privacy divider section of an aircraft compartment passenger suite, in accordance with one or more embodiments of the disclosure.

As illustrated in FIG. 6A, the display devices 124 may each be set in a deployed position. The display devices 124 may be in a landscape orientation when in the deployed position.

Figure 6B:
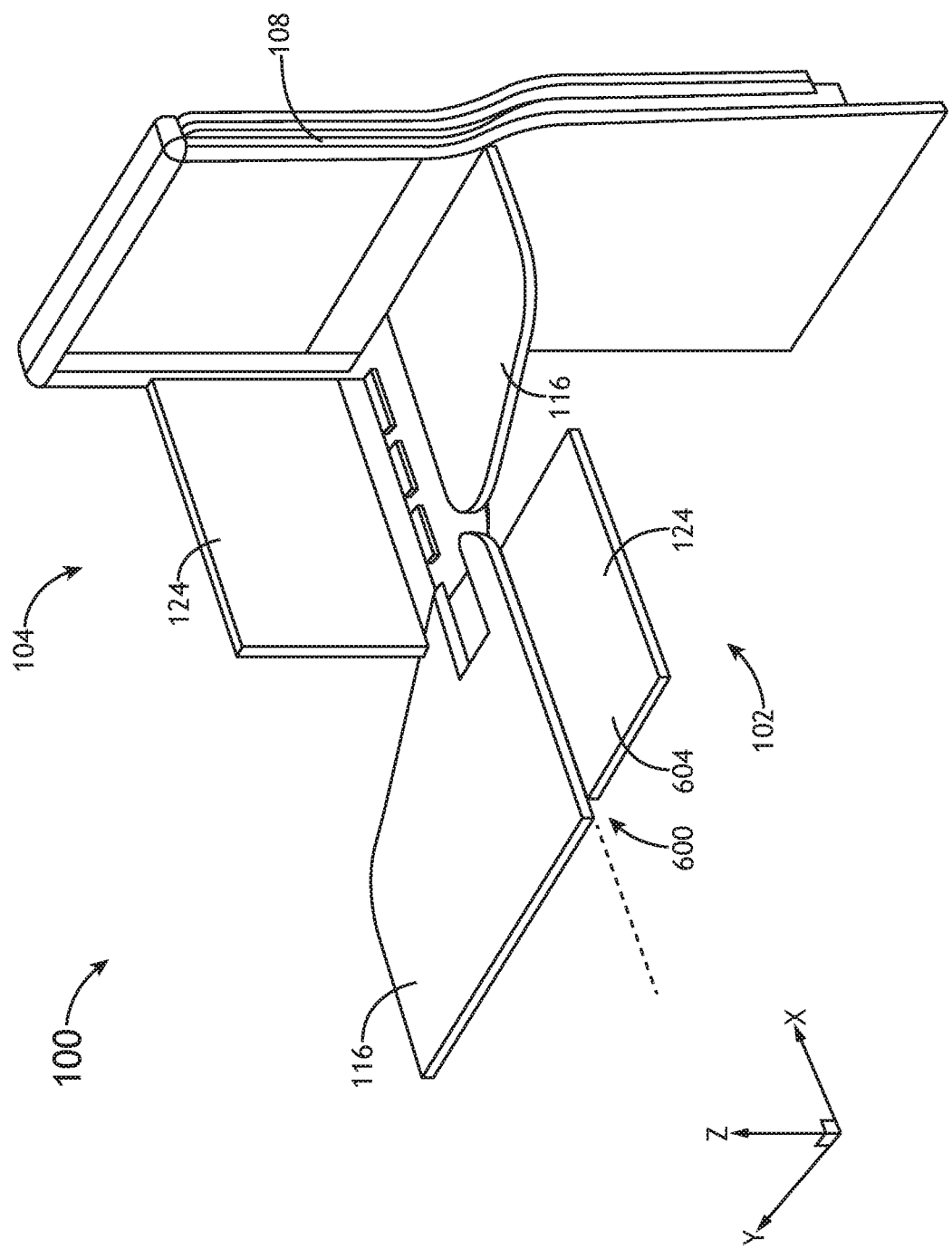
FIG. 6B illustrates a set of display devices and a privacy divider section of an aircraft compartment passenger suite, in accordance with one or more embodiments of the disclosure.

As illustrated in FIG. 6B, the display device 124 of the side 102 may be configured to actuate between the deployed position and a stowed position. The display device 124 of the side 102 may be coupled to an actuation assembly 600. It is noted herein that actuation assembly 600, stowage mechanism 600, display device actuation assembly 600, and display device stowage mechanism 600 may be considered equivalent, for purposes of the present disclosure.

The display device 124 of the side 102 may rotate about an axis (e.g., an axis through the display device 124, or an y-z plane) via the actuation assembly 600, such that the display device 124 of the side 102 faces downward to a floor surface (e.g., a footwell) of the aircraft passenger compartment suite 100. A screen portion of the display device 124 of the side 102 may be protected with a shield or cover when in the stowed position.

Figure 6C:
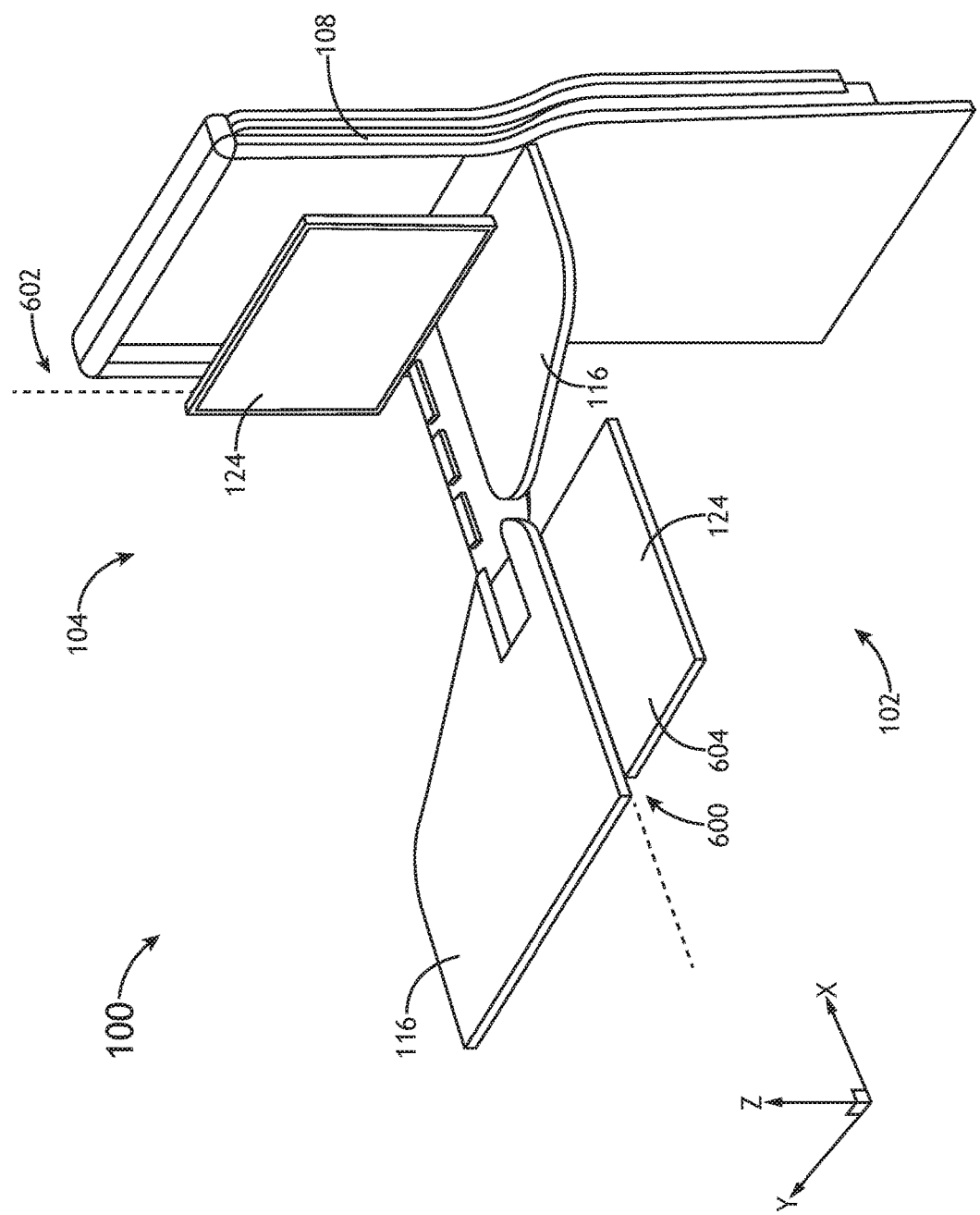
FIG. 6C illustrates a set of display devices and a privacy divider section of an aircraft compartment passenger suite, in accordance with one or more embodiments of the disclosure.

As illustrated in FIG. 6C, the display device 124 of the side 104 may be configured to actuate between the deployed position and a stowed position. The display device 124 of the side 104 may be coupled to an actuation assembly 602. It is noted herein that actuation assembly 602, stowage mechanism 602, display device actuation assembly 602, and display device stowage mechanism 602 may be considered equivalent, for purposes of the present disclosure.

The display device 124 of the side 104 may rotate about an axis (e.g., an axis through a horizontal surface of a monument 116, or a x-y plane) via the actuation assembly 602.

In the example provided in FIGS. 6B and 6C, a rear surface of the rotated display device 124 of the side 102 may include a pattern or other decorative surface 604. The rear surface of the rotated display device 124 of the side 102 may act as a horizontal surface (e.g., an extension of a monument 116, or a standalone table) when facing upward following a rotation about the axis (e.g., an axis through the display device 124, or an y-z plane) via the actuation assembly 600.

Figure 6D:
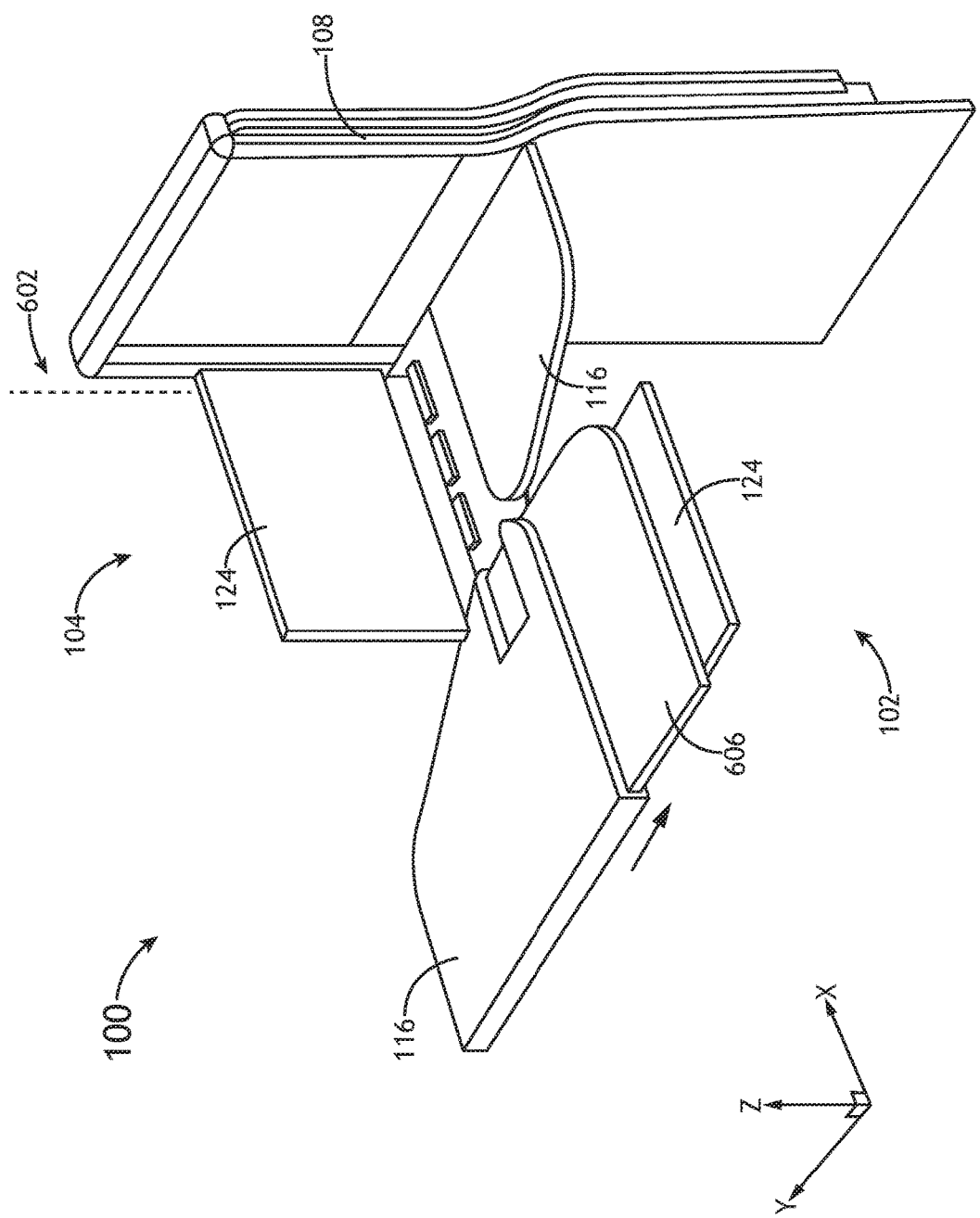
FIG. 6D illustrates a set of display devices and a privacy divider section of an aircraft compartment passenger suite, in accordance with one or mare embodiments of the disclosure.

As illustrated in FIG. 6D, the rotated display device 124 of the side 102 may be protected with a cover 606, which may occur after the rotation illustrated in FIG. 6B. For example, the cover 606 may be stored in a cavity defined in the monument 116 and slid over the rotated display device 124 of the side 102. By way of another example, the cover 606 may be separate and be manually placed over the rotated display device 124 of the side 102. Here, the cover 606 may act as a horizontal surface (e.g., an extension of a monument 116, or a standalone table).

It is noted herein, however, that the cover 606 may protect the screen of the rotated display device 124 of the side 102. For example, the cover 606 may be slid out from underneath a monument 116 and under the rotated display device 124 of the side 102. By way of another example, the cover 606 may separate and be manually placed under the rotated display device 124 of the side 102. Here, the rear surface of the rotated display device 124 of the side 102 may act as a horizontal surface (e.g., an extension of a monument 116, or a standalone table) when facing upward following a rotation about the axis (e.g., an axis through the display device 124, or an y-z plane) via the actuation assembly 600.

Figure 6E:
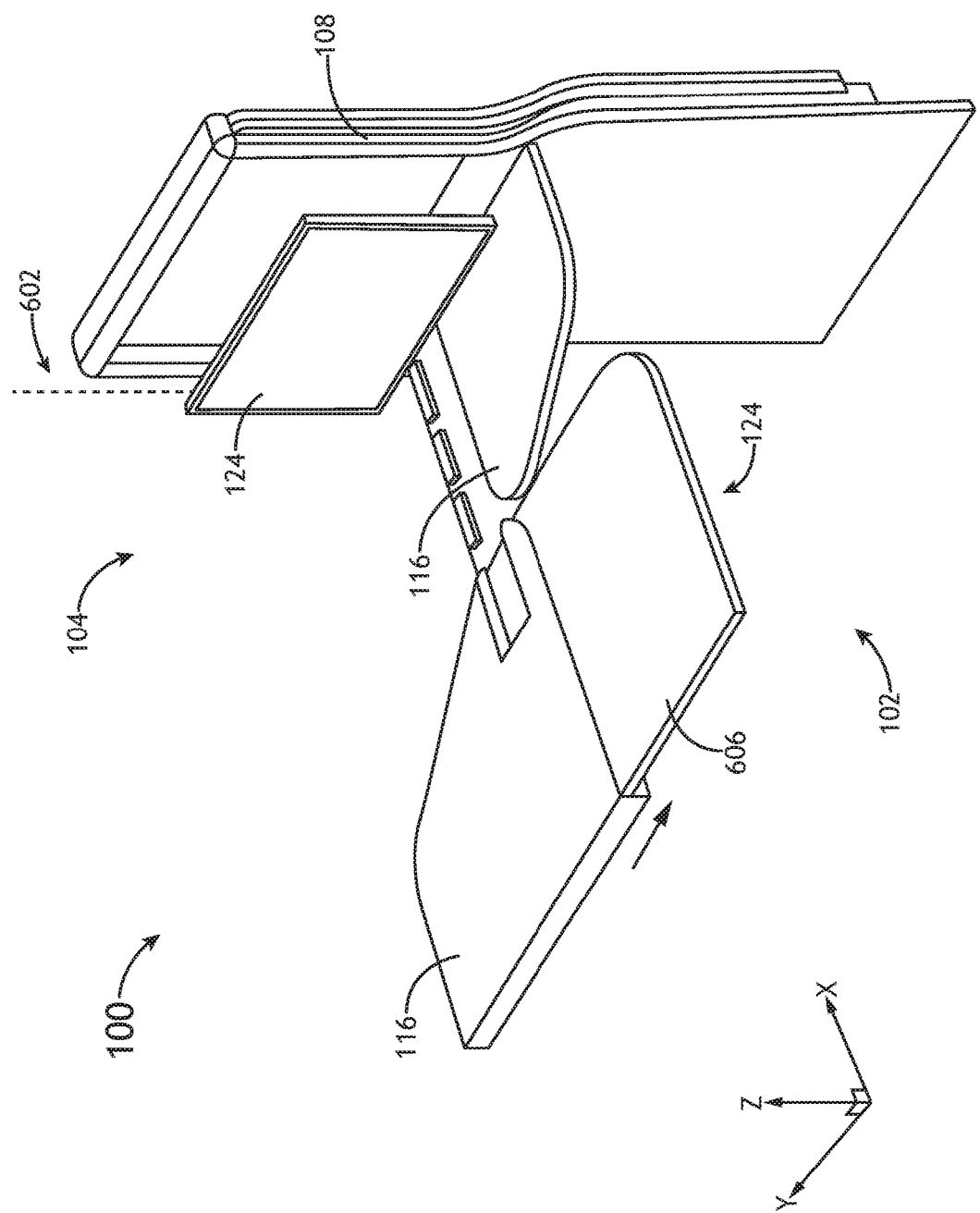
FIG. 6E illustrates a set of display devices and a privacy divider section of an aircraft compartment passenger suite, in accordance with one or more embodiments of the disclosure.

As illustrated in FIG. 6E, the display device 124 of the side 104 may be configured to actuate between the deployed position and a stowed position, which may occur after the actuation illustrated in FIG. 6B. The display device 124 of the side 104 may be coupled to the actuation assembly 602. The display device 124 of the side 104 may rotate about an axis (e.g., an axis through a horizontal surface of a monument 116, or a y-z plane) via the actuation assembly 602.

The placement of the cover 606, as illustrated in FIG. 6D, may occur before or after the actuation of the display device 124 of the side 104 between the deployed position and the stowed position.

It is noted herein the display device 124 of the side 104 may be rotated via the actuation assembly 602 independently of the display device 124 of the side 102 rotating about the actuation assembly 600. For example, the display device 124 of the side 102 may rotate before the display device 124 of the side 104, where the display device 124 of the side 102 in the deployed position would inhibit rotation of the display device 124 of the side 104. It is noted herein, however, the rotation of the display device 124 of the side 102 and the rotation of the display device 124 of the side 104 may be tied together for a smooth transition.

Although embodiments of the disclosure illustrate FIGS. 6D and 6E as being an alternative example to FIG. 6C, it is noted herein that any of the discussion related to FIG. 6C may be applied to FIGS. 6D and 6E, and vice versa. For example, the display device 124 of the side 102 being protected with the cover 606 may still include a pattern or other decorative surface 604, which may act as an extension of a horizontal surface of a monument 116. Therefore, the above description should not be interpreted as a limitation on the scope of the disclosure but merely an illustration.

It is noted herein that any description of the one or more components of the aircraft passenger compartment suite 100, including any components of the side 102, the side 104, and the privacy divider 106 (e.g., as described with respect to FIGS. 1A-1C) may be applied to FIGS. 6A-6E.

In this regard, as illustrated in FIGS. 5A-5C and 6A-6E, the display device 124 of the first side 102 may be viewable from the first side 102 when in the deployed position, but may be unviewable from either side 102 or side 104 when in the stowed position. In addition, the display device 124 of the second side 104 may be viewable from the second side 104 when in the deployed position, and may be viewable from both the first side 102 and the second side 104 when in the stowed position.

In addition, it is noted herein each of the display devices 124 as illustrated in FIGS. 5A-5C and 6A-6E may be configured to dock in a deployed position and/or a stowed position (e.g., with one or more anchor points. For example, each of the display devices 124 may be allowed to freely actuate between the deployed position and the stowed position without the assistance of actuating harnesses and/or actuating mechanisms, as the one or more anchor points may reduce or eliminate the need for the actuating harnesses and/or actuating mechanisms to lock the display devices 124 in the respective deployed position and/or stowed position.

Although embodiments of the disclosure illustrate components as being installed within and/or related to the side 102 or the side 104, it is noted herein any discussion about components installed within and/or related to the side 102 may be applied to the side 104, and vice versa. Therefore, the above description should not be interpreted as a limitation on the scope of the disclosure but merely an illustration.

Figure 7:
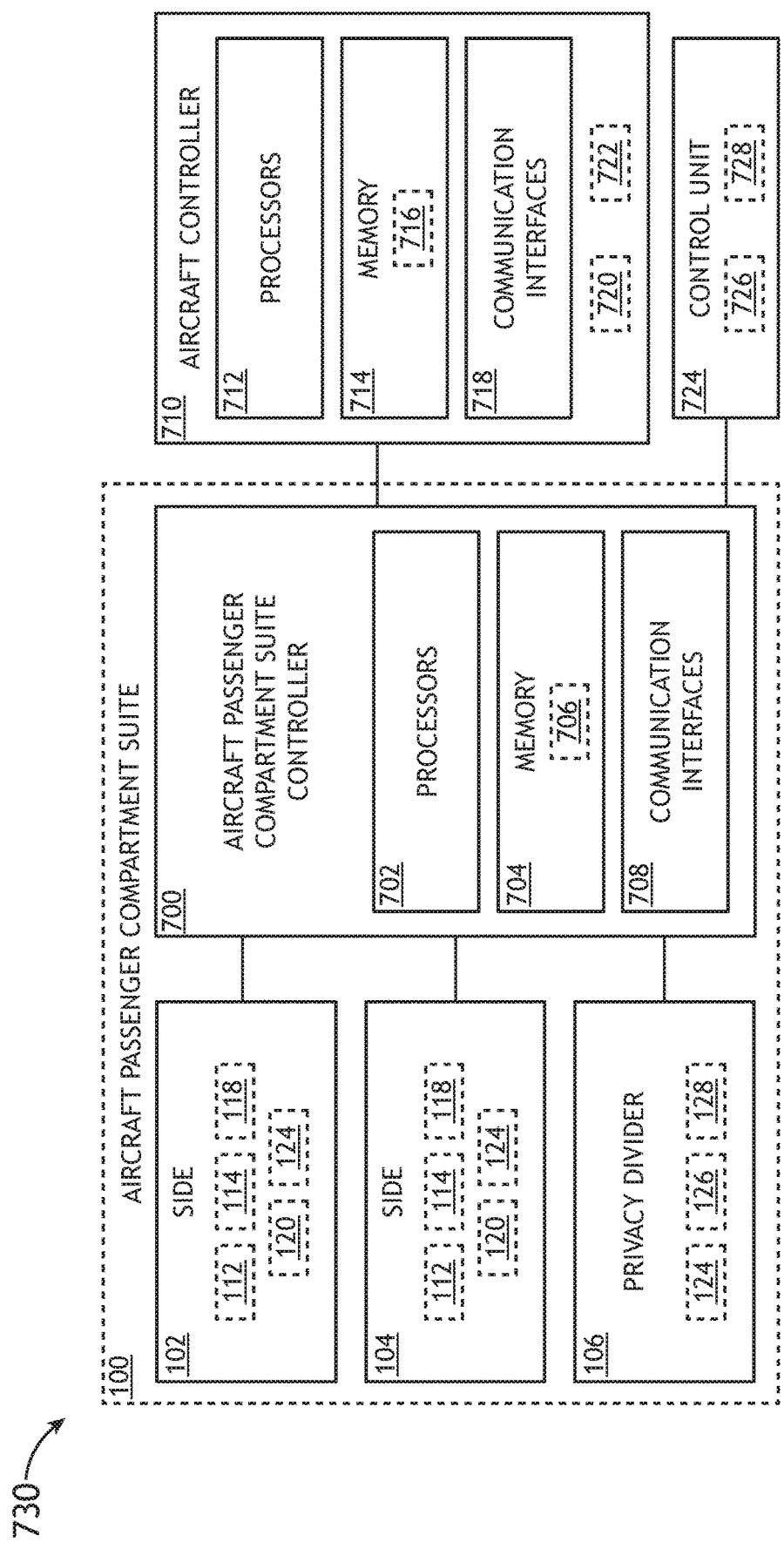
FIG. 7 illustrates a block diagram of an aircraft including an aircraft compartment passenger suite, in accordance with one or more embodiments of the disclosure.

FIG. 7 illustrates a block diagram of a passenger aircraft 730 including the aircraft passenger compartment suite 100, in accordance with one or more embodiments of the disclosure.

The passenger aircraft 730 may include one or more aircraft passenger compartment suite controllers 700 (e.g., in the aircraft passenger compartment suite 100). The one or more aircraft passenger compartment suite controllers 700 may include one or more processors 702 and memory 704. The memory 704 may store one or more sets of program instructions 706. The one or more processors 702 may be configured to execute the one or more sets of program instructions 706 to carry out one or more of the various steps described throughout the present disclosure. The one or more aircraft passenger compartment suite controllers 700 may include one or more communication interfaces 708.

The one or more aircraft passenger compartment suite controllers 700 may be coupled (e.g., physically and/or communicatively coupled) to one or more components in the side 102 (e.g., the aircraft seat 112, the ottoman 114, the tray 118, the one or more lights 120, and/or the one or more display devices 124).

The one or more aircraft passenger compartment suite controllers 700 may be coupled (e.g., physically and/or communicatively coupled) to components in the side 104 (e.g., the aircraft seat 112, the ottoman 114, the tray 118, the one or more lights 120, and/or the one or more display devices 124).

The one or more aircraft passenger compartment suite controllers 700 may be coupled (e.g., physically and/or communicatively coupled) to components in the privacy divider 106 (e.g., the one or more display devices 124, the one or more actuatable panels 126, and/or the one or more actuatable panels 128).

The one or more aircraft passenger compartment suite controllers 700 may transmit instructions, power, control signals, data, or the like to the one or more components in the side 102, the side 104, and/or the privacy divider 106. The one or more aircraft passenger compartment suite controllers 700 may receive instructions, power, control signals, data, or the like from the one or more components in the side 102, the side 104, and/or the privacy divider 106.

The one or more aircraft passenger compartment suite controllers 700 may be coupled (e.g., physically and/or communicatively coupled) to one or more external aircraft controllers 710. The one or more aircraft controllers 710 may include one or more processors 712 and memory 714. The memory 714 may store one or more sets of program instructions 716. The one or more processors 712 may be configured to execute the one or more sets of program instructions 716 to carry out one or more of the various steps described throughout the present disclosure. The one or more aircraft controllers 710 may include one or more communication interfaces 718.

The one or more aircraft controllers 710 may be coupled to one or more display devices 720. The one or more aircraft controllers 710 may be coupled to one or more user input devices 722.

The one or more aircraft passenger compartment suite controllers 700 may be coupled to a control unit 724. The control unit 724 may be coupled to one or more display devices 726. The control unit 724 may be coupled to one or more user input devices 728. The passenger control unit 724 may be positioned in the aircraft passenger compartment suite 100 for use by a passenger. The passenger control unit 724 may be positioned on an external surface of the aircraft passenger compartment suite 100 for use by a crew member.

It is noted herein the control unit 724 may be considered to be at least a portion of the one or more aircraft passenger compartment suite controllers 700. For example, the control unit 724 may be a component of the one or more aircraft passenger compartment suite controllers 700. By way of another example, the control unit 724 may be integrated in the one or more aircraft passenger compartment suite controllers 700. In addition, it is noted herein the control unit 724 may be considered to include and/or be a passenger seat control unit, for purposes of the present disclosure.

The one or more processors 702, 712 may include any one or more processing elements known in the art. In this sense, the one or more processors 702, 712 may include any microprocessor device configured to execute algorithms and/or program instructions. In general, the term "processor" may be broadly defined to encompass any device having one or more processing elements, which execute a set of program instructions from a non-transitory memory medium (e.g., the memory 704, 714), where the one or more sets of program instructions 706, 716 are configured to cause the one or more processors 702, 712 to carry out any of one or more process steps.

The memory 704, 714 may include any storage medium known in the art suitable for storing the one or more sets of program instructions 706, 716 executable by the associated one or more processors 702, 712. For example, the memory 704, 714 may include a non-transitory memory medium. For instance, the memory 704, 714 may include, but is not limited to, a read-only memory (ROM), a random access memory (RAM), a magnetic or optical memory device (e.g., disk), a magnetic tape, a solid state drive, and the like. The memory 704, 714 may be configured to provide display information to the one or more display devices 124, 720, 726. In addition, the memory 704, 714 may be configured to store user input information from the one or more user input devices 722, 728. The memory 704, 714 may be housed in a common controller housing with the one or more processors 702, 712. The memory 704, 714 may, alternatively or in addition, be located remotely with respect to the spatial location of the processors 702, 712, the one or more aircraft passenger compartment suite controllers 700 and/or the one or more aircraft controllers 710. For instance, the one or more processors 702, 712, the one or more aircraft passenger compartment suite controllers 700, and/or the one or more aircraft controllers 710 may access a remote memory 704, 714 (e.g., server), accessible through a network (e.g., internet, intranet, and the like) via one or more communication interfaces.

The one or more communication interfaces 708, 718 may be operatively configured to communicate with one or more components of the aircraft passenger compartment suite controller 700 and/or the one or more components of the aircraft controller 710. For example, the one or more communication interfaces 708, 718 may also be coupled (e.g., physically, electrically, and/or communicatively) with the one or more processors 702, 712 to facilitate data transfer between components of the one or more components of the aircraft passenger compartment suite controller 700 and/or the one or more components of the aircraft controller 710 and the one or more processors 702, 712. For instance, the one or more communication interfaces 708, 718 may be configured to retrieve data from the one or more processors 702, 712, or other devices, transmit data for storage in the memory 704, 714, retrieve data from storage in the memory 704, 714, or the like. By way of another example, the aircraft passenger compartment suite controller 700 and/or the aircraft controller 710 may be configured to receive and/or acquire data or information from other systems or tools by a transmission medium that may include wireline and/or wireless portions. By way of another example, the aircraft passenger compartment suite controller 700 and/or the aircraft controller 710 may be configured to transmit data or information (e.g., the output of one or more procedures of the inventive concepts disclosed herein) to one or more systems or tools by a transmission medium that may include wireline and/or wireless portions (e.g., a transmitter, receiver, transceiver, physical connection interface, or any combination). In this regard, the transmission medium may serve as a data link between the aircraft passenger compartment suite controller 700 and/or the aircraft controller 710 and the other subsystems (e.g., of the passenger aircraft 730 and/or the aircraft passenger compartment suite 100). In addition, the aircraft passenger compartment suite controller 700 and/or the aircraft controller 710 may be configured to send data to external systems via a transmission medium (e.g., network connection).

Although the present disclosure is directed to the one or more aircraft passenger compartment suite controllers 700 and the one or more aircraft controllers 710 being separate, it is noted herein the one or more aircraft passenger compartment suite controllers 700 and the one or more aircraft controllers 710 may be the same and/or share select components. Therefore, the above description should not be interpreted as a limitation on the present disclosure but merely an illustration.

The one or more display devices 124, 720, 726 may include any display device known in the art. For example, the one or more display devices 124, 720, 726 may include, but are not limited to, a liquid crystal display (LCD), a light-emitting diode (LED) based display, an organic light-emitting diode (OLED) based display, an electroluminescent display (ELD), an electronic paper (E-ink) display, a plasma display panel (PDP), a display light processing (DLP) display, a cathode-ray tube (CRT), or the like. Those skilled in the art should recognize that a variety of display devices 124, 720, 726 may be suitable for implementation in the present invention and the particular choice of display device may depend on a variety of factors, including, but not limited to, form factor, cost, and the like. In a general sense, any display device capable of integration with the user input device (e.g., touchscreen, bezel mounted interface, keyboard, mouse, trackpad, and the like) is suitable for implementation in the present invention.

The one or more user input devices 722, 728 may include any user input device known in the art. For example, the one or more user input devices 722, 728 may include, but are not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device, or the like. In the case of a touchscreen interface, those skilled in the art should recognize that a large number of touchscreen interfaces may be suitable for implementation in the present invention. For instance, the one or more display devices 124, 720, 726 may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present invention. In another embodiment, the input devices may include, but is not limited to, a bezel mounted interface.

Although embodiments of the present disclosure are directed to the one or more display devices 124, 720, 726 being indirectly coupled to the corresponding one or more user input devices 722, 728 indirectly (e.g., via the one or more aircraft passenger compartment suite controllers 700 and/or the one or more aircraft controllers 710), it is noted herein the one or more display devices 124, 720, 726 may be directly coupled to the corresponding one or more user input devices 722, 728. For example, the one or more display devices 124, 720, 726 may be housed with the one or more user input devices 722, 728 in a common user interface housing. Therefore, the above description should not be interpreted as a limitation on the present disclosure but merely an illustration.

It is noted herein that any embodiments directed to the display devices 720, 726 and/or the user input devices 722, 728 may be directed to the one or more display devices 124 installed within the aircraft passenger compartment suite 100. Therefore, the above description should not be interpreted as a limitation on the present disclosure but merely an illustration.

Although embodiments of the present disclosure illustrate the actuation of components of the aircraft passenger compartment suite 100 via the control unit 724 (e.g., where the components are driven via a motor), it is noted herein that one or more components of the aircraft seat 112 may be actuated by engaging a handle that activates one or more analog mechanical assemblies. Therefore, the above description should not be interpreted as a limitation on the scope of the disclosure but merely an illustration.

Although the present disclosure is directed to the aircraft passenger compartment suite 100 being installed in the passenger aircraft 730, it is noted herein the aircraft passenger compartment suite 100 may be installed within any number of environments. For example, the environment may include any type of vehicle known in the art. For instance, the vehicle may be any air, land, or water-based personal equipment or vehicle; any air, land, or water-based commercial equipment or vehicle; any air, land, or water-based military equipment or vehicle known in the art. By way of another example, the environment may include a commercial or industrial establishment (e.g., a home or a business).

It is noted herein that one or more components of the aircraft passenger compartment suite 100 may need to be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An aircraft passenger compartment suite, comprising:
    a first side including a first display device, the first display device being configured to actuate between a first display device deployed position and a first display device stowed position via a first display device stowage mechanism, the first display device stowage mechanism configured to rotate the first display device 90 degrees between a landscape orientation and a portrait orientation, the first display device in the portrait orientation when in the stowed position;
    a second side including a second display device, the second display device being configured to actuate between a second display device deployed position and a second display device stowed position via a second display device stowage mechanism; and
    a privacy divider separating the first side including the first display device and the second side including the second display device, the privacy divider comprising one or more panels, the one or more panels being configured to actuate between a panel deployed position and a panel stowed position,
    the privacy divider being open when at least one of the first display device is in the first display device stowed position, the second display device is in the second display device stowed position, or the one or more panels are in the panel stowed position the first display device stowage mechanism configured to rotate the first display device about a first axis,
    the second display device stowage mechanism configured to rotate the first display device and the second display device about a second axis.

2. The aircraft passenger compartment suite of claim 1, the privacy divider being closed when the first display device is in the first deployed position, the second display device is in the second deployed position, and the one or more panels are in the panel deployed position.

3. The aircraft passenger compartment suite of claim 1, the first display device stowage mechanism and the second display device stowage mechanism including one or more different actuation components.

4. The aircraft passenger compartment suite of claim 3, the first display device stowage mechanism comprising:
    an arm coupled to the privacy divider via a first coupler and coupled to the first display device via a second coupler,
    the arm configured to rotate the first display device between the first display device deployed position and the first display device stowed position about an axis through the first coupler.

5. The aircraft passenger compartment suite of claim 4, the arm configured to rotate the first display device between the first display device deployed position and the first display device stowed position about an axis through the second coupler.

6. The aircraft passenger compartment suite of claim 1, the one or more panels comprising:
    one or more panels configured to stow proximate to the first display device in a first panel stowed position when the first display device is in the first display device stowed position.

7. The aircraft passenger compartment suite of claim 1, the one or more panels comprising:
    one or more panels configured to stow proximate to the second display device in a second panel stowed position when the second display device is in the second display device stowed position.

8. The aircraft passenger compartment suite of claim 1, the one or more panels comprising:
    one or more panels configured to stow by actuating upward about an axis through a top edge of the one or more panels.

9. An aircraft passenger compartment suite, comprising:
    a first stowage mechanism configured to actuate a first display device, the first display device positioned in a first side of the aircraft passenger compartment suite when in a first display device deployed position, the first display device being viewable from the first side when in the first display device deployed position; and
    a second stowage mechanism configured to actuate a second display device, the second display device positioned in a second side of the aircraft passenger compartment suite when in a second display device deployed position, the second side including the second display device being separated from the first side including the first display device via a privacy divider, the second display device being viewable from the second side when in the second display device deployed position,
    the second display device being viewable from the first side and the second side when in a second display device stowed position,
    the first stowage mechanism configured to rotate the first display device about a first axis,
    the second stowage mechanism configured to rotate the first display device and the second display device about a second axis,
    the first display device facing inward toward a surface of a privacy shell element of the aircraft passenger compartment suite following the rotation of the first display device and the second display device about the second axis,
    the second display device facing outward into the aircraft passenger compartment suite following the rotation of the first display device and the second display device about the second axis.

* * * * *